United States Patent [19]
Barone et al.

[11] Patent Number: 5,315,711
[45] Date of Patent: May 24, 1994

[54] METHOD AND APPARATUS FOR REMOTELY AND CENTRALLY CONTROLLING A PLURALITY OF HOST PROCESSORS

[75] Inventors: Stan T. Barone, Fridley; Ian R. Hepburn, Minnetonka, both of Minn.; Gary E. Fladmoe, Salt Lake City, Utah; Robert D. Vavra, Roseville, Minn.

[73] Assignee: Unisys Corporation, Blue Bell, Pa.

[21] Appl. No.: 786,858

[22] Filed: Nov. 1, 1991

[51] Int. Cl.⁵ .................................... G06F 15/02
[52] U.S. Cl. ........................ 395/275; 395/200
[58] Field of Search ......... 395/153, 154, 157, 275, 395/200

[56] References Cited

U.S. PATENT DOCUMENTS

| | | | |
|---|---|---|---|
| 4,761,642 | 8/1988 | Huntzinger | 395/157 |
| 4,845,644 | 7/1989 | Anthias et al. | 395/157 |
| 4,860,247 | 8/1989 | Uchida et al. | 395/153 |
| 4,903,218 | 2/1990 | Longo et al. | 395/157 |
| 4,910,704 | 3/1990 | Gemma | 364/900 |
| 4,924,434 | 5/1990 | Christenson et al. | 364/900 |
| 4,953,159 | 8/1990 | Hayden et al. | 370/62 |
| 4,974,173 | 11/1990 | Stefik et al. | 364/521 |
| 5,008,853 | 4/1991 | Bly et al. | 395/157 |
| 5,019,963 | 5/1991 | Alderson et al. | 364/200 |
| 5,073,933 | 12/1991 | Rosenthal | 395/157 |
| 5,129,056 | 7/1992 | Eagen et al. | 395/155 |
| 5,157,763 | 10/1992 | Peters et al. | 395/157 |
| 5,195,086 | 3/1993 | Baumgartner et al. | 370/62 |
| 5,197,124 | 3/1993 | Busboom et al. | 395/155 |
| 5,204,947 | 4/1993 | Bernstein et al. | 395/157 |
| 5,208,912 | 5/1993 | Nakayama et al. | 395/200 |
| 5,231,571 | 7/1993 | D'Agostino | 364/408 |
| 5,239,466 | 8/1993 | Morgan et al. | 395/200 |
| 5,245,553 | 9/1993 | Tanenbaum | 395/153 |
| 5,247,614 | 9/1993 | Eagen et al. | 395/200 |
| 5,247,615 | 9/1993 | Mori et al. | 395/200 |
| 5,253,341 | 10/1993 | Rozmanith et al. | 395/200 |
| 5,255,358 | 10/1993 | Busboom et al. | 395/153 |
| 5,261,051 | 11/1993 | Masden et al. | 395/200 |

Primary Examiner—Robert L. Richardson
Assistant Examiner—Moustafa M. Meky
Attorney, Agent, or Firm—LeRoy D. Maunu; Charles A. Johnson; Mark T. Starr

[57] ABSTRACT

A method is disclosed for controlling a plurality of host processors from either a single remote workstation or a plurality of remote workstations. The user interface and level of control at the remote workstation is identical to that which is available at the host processor operations console. Operator alerts appearing at the operations console are forwarded to the remote workstation for notifying the remote operator of alert conditions occurring at the operations console. A computer serving as the operation console for the host processor is coupled to a communications network. Upon operator initiation, a workstation, also connected to the network, sends a message to the console requesting that a console window be started. After the console window is started on the workstation, the operations console duplicates its user interface at the remote workstation and the host processor connected to the console can be controlled from the workstation. This operation can be repeated for multiple host processors.

29 Claims, 27 Drawing Sheets

Microfiche Appendix Included
(10 Microfiche, 1961 Pages)

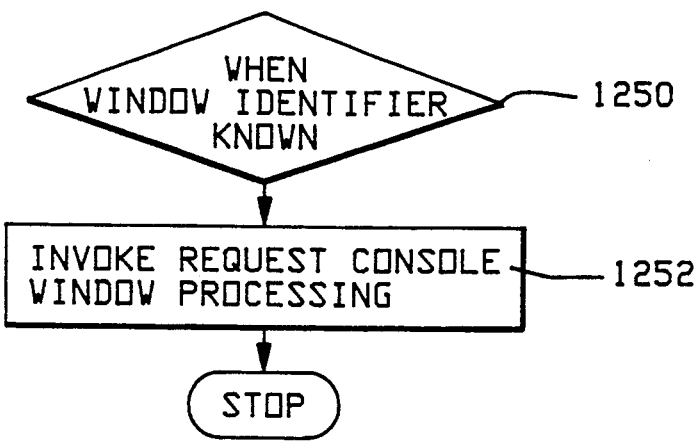
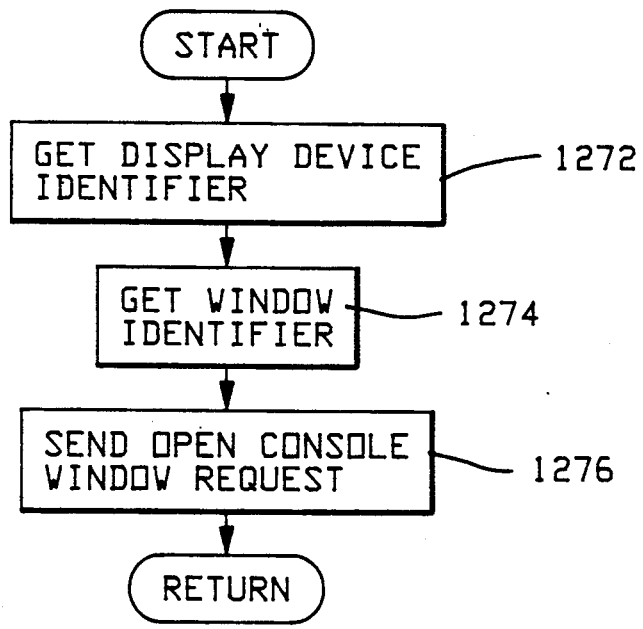
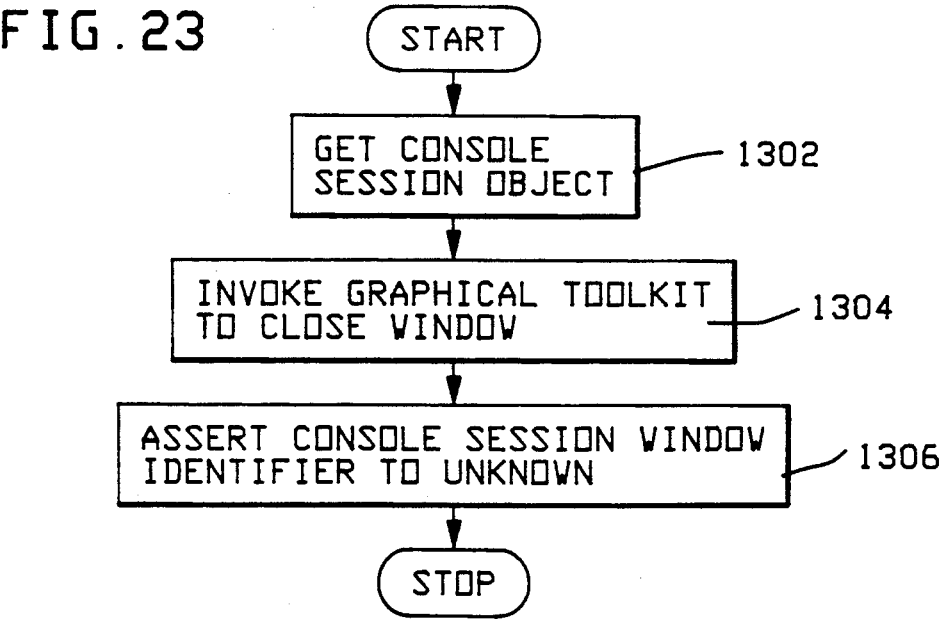

METHOD AND APPARATUS FOR REMOTELY AND CENTRALLY CONTROLLING A PLURALITY OF HOST PROCESSORS

MICROFICHE APPENDIX

This disclosure refers to a microfiche appendix having 10 microfiche and a total of 1961 frames.

COPYRIGHT AUTHORIZATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF INVENTION

This invention relates to the operation of digital data processing systems. In particular, this invention shows a system whereby a plurality of digital data processing systems can be remotely operated from either a single workstation or a plurality of workstation computers. Still more particularly, the same operator capabilities, available at the digital data processing system operator's console, are available at a workstation computer which is coupled to a communications network which is shared with the operator's console.

BACKGROUND DESCRIPTION

Digital data processing systems, hereinafter referred to as "Host Processors", have historically required operator control for the day to day operations of the host processor. Prior art operator/Host Processor interfaces have included an Operation Console directly coupled to the Host Processor. A typical Operation Console included a keyboard for entry of control commands, a plurality of selector switches, one or more banks of indicator lamps, and a CRT display for providing system status information to the operator.

In particular, the Operation Console is the means through which an operator can enter commands to the Host Processor's operating system, and monitor messages coming from the operating system and from other lower level Host Processor control software, thereby controlling the Host Processor. Specifically, the operator can gather information about a host and undertake a number of tasks, some of which are listed in Table 1.

---
1. Boot/Start
2. Configure
3. Restart
4. Job Scheduling
5. Job Salvaging
6. Resource Management
    - Disk Drives
    - Tape Drives
    - Memory
    - Instruction Processors
7. User Management
8. File Management
9. React to Exception Conditions and Alarms
---

Along with the increase in processing capacity of Host Processors has come the increase in operating complexity. With the increase in operational complexity has come the increasing cost of operation. Recognizing the problem of increased cost of operation of Host Processors, those in the industry have set forth various strategies to attack this problem. Three of the various strategies include: 1) easy to use operator interfaces 2) operation automation; and 3) operation centralization.

One implementation of the easy to use operator interface strategy is the commercially available SHIELD Friendly Console for 2200 Series Host Processors sold by the assignee of the present invention. The SHIELD Friendly Console can be used in place of the traditional Operation Console described earlier. The SHIELD Friendly Console consists of software running on a personal computer which provides enhanced display of output messages, a menu driven interface for the generation of input commands to the Host Processor, and context sensitive help. The combination of capabilities provided by the SHIELD Friendly Console helps to make the operation of a complex Host Processor less than an ordeal.

A solution to automate the operation of Host Processors is currently marketed by the assignee of the present invention. Operation automation of 2200 Series Host Processors can be obtained by using the Unisys Smart Console. When combined with the SHIELD Friendly Console, the Smart Console replaces the traditional Operation Console described earlier. The Smart Console consists of software running on a personal computer which is capable of automatically generating commands to the Host Processor and responding to requests for operator input from the Host Processor.

A limited capability for operation centralization has been developed and sold by the assignee of the present invention. This capability consists of hardware and software added to the aforementioned SHIELD Friendly/Smart Console combination which: 1) provides a communications network interface for the Console, and 2) provides a message passing service between software on the Console and software on another computer (e.g. a Workstation) which is coupled to the same communication network to which the Console is coupled.

Centralized operation can be accomplished by coupling a plurality of Operation Consoles to a common communication network and developing a program for the Workstation to establish and maintain a software coupling with a plurality of Consoles. Once the Workstation program has established software connections with the Consoles, another program would provide an operator interface for sending input commands to the respective Consoles and ultimately the respective Host Processors, and receiving messages from the respective Consoles.

While this method of centralized operation brought Console operation of a plurality of Host Processors to a single location, it came at the expense of losing the easy to use operator interface available in the SHIELD Friendly Console. Without reducing the operational complexity of Host Processors through an easy to use interface, the potential number of Host Processors which can be effectively operated at a central location is limited.

In addition to loss of the easy to use interface, the prior art method for centrally operating Host Processors did not provide all functionality available on the Console at the Workstation. This is owed to the fact that the prior art method was based on a message passing scheme. In order to make all Console operational capabilities available at the Workstation, each Console application program would be required to be programmed to handle the message passing interface.

Coupled with the previous two limitations, is the loss of the Console alarm capability in the prior art centralized operations approach. Upon detection of an alarm condition, the prior art Console would notify the local operator through visual cues on the Console Video Display Terminal and audio cues output through a speaker on the Console. With the prior art centralized operations implementation, these visual and audio cues were not sent across the communications network to a Workstation coupled through a network to the Console. Thus an operator at the Workstation had no way of knowing when an alarm condition existed on a Console.

Related to the concept of centralized Host Processor operation is the notion of remote Host Processor operation. Remote operation can be thought of as operation of a Host Processor from a location removed from the physical location of the Host Processor. The extent to which the operational capability is removed from the physical location of the Host Processor goes to the degree to which operations may be classified as remote.

The prior art Console provided the capability to couple the Console to a modem and telephone line, thereby enabling an operator to dial into and communicate with the Console. Once dialed in, the operator could enter input to the Console and have Console output displayed on a dumb terminal. While the prior art console did provide the capability for remote operation, it did not permit more than one terminal at a time to interact with the Console, nor could more than one Console interact with any one terminal.

In using the modem connection as a means to remotely operate a Host Processor, the Console alarm capability (as described above) consisted of sending a character sequence to the coupled dumb terminal. The character sequence caused the terminal to emit an audible cue to the operator. One disadvantage inherent in this scheme is that if a plurality of dumb terminals, all of which are coupled to Consoles, were gathered in a single location, it would be difficult to discern the audio alarms from one terminal from the audio alarms of another terminal.

As described above, the prior art approach to remote and centralized Host Processor operation lacked the full complement of Console functionality and an adequate alarm capability. Neither the centralized nor the remote approach to Host Processor operations found in the prior art provided a consistent and complete user interface as compared with that available at the local Console. Both the visual video display characteristics and the keyboard manipulation necessary for Host Processor operation input at the remote location differed from that found at the local Console. Furthermore, the capability to operate a Host Processor from a plurality of remote locations did not exist.

SUMMARY OF THE INVENTION

It is a primary object of the present invention to provide a method and apparatus for remotely and centrally controlling a plurality of host processors from a single remote workstation, wherein the level of control available, and the user interface characteristics at the remote workstation are equivalent to the level of control available and user interface characteristics at the host processor's local operation console.

It is yet another object of the present invention to provide a method and apparatus for remotely controlling a single host processor from a plurality of remote workstations, with the level of control available at the remote workstations equivalent to the level of control available at the host processor's operation console.

Still another object of the present invention is to provide a method and apparatus for remotely controlling a plurality of host processors from a plurality of remote workstations, with the level of control available at the remote workstations equivalent to the level of control available at the host processor's operation console.

It is yet another object of the present invention to give the operator, who is remotely controlling the host processor, the capability to respond to host processor alert conditions at the console by notifying the remote operator of these alert conditions.

The objects of the present invention are accomplished by programming the operation console, coupled to a host processor, to communicate with a workstation through a communications network. The console, itself a programmable digital computer, is the means through which the host is locally controlled and monitored. A communications network, to which the console is coupled, provides the link necessary to remotely control the host processor. Also coupled to the network is a workstation, which provides the programmable computing means through which the host is remotely controlled.

A message requesting that remote operation be enabled is sent from the workstation to the console over the communications network. Upon receipt of an "Open Console Window" message from the console, the workstation opens a console window on the workstation video display, with the console window duplicating the user interface which is available on the console. After the console window is opened on the workstation video display, any changes in a console display screen are sent from the console to the workstation and the changes are reflected in the console window on the workstation video display.

The following scenarios illustrate the operation of a console window. When a message is sent from the host processor operating system to the console, the message is displayed on the console video display in accordance with the console user interface. At the same time that the console video display is being updated, the same display changes are sent to a program executing on the workstation. The workstation program then updates the console window with the same console display changes.

In a similar manner, the host processor can be remotely controlled from the workstation by input commands which are entered through a console window. Input to the console through the console window is handled as follows: When a key on the workstation keyboard is struck, the character corresponding to the key is sent to the console. The console then takes action on the input according to the user interface definition. The action taken will depend upon the context in which the key was struck. For instance, if the key was struck in a menu system context, a menu entry may be highlighted. If the key was struck in a command line context, the character may be echoed on the command line. In either case, there is a change to be applied to the console display screen in accordance with the key.

NOTE: "Commands" and "menus" are terms of art whose meaning is well understood by those familiar with the design of user interfaces for computer programs. Simply stated, a "command" interface refers to a method whereby a user literally types commands on a keyboard and the commands are then interpreted by the program.

When using a "menu" interface, one possible scheme is for the program to display a list of program defined keywords for the user, and the user then has the option of choosing one of the keywords. Upon selection of a keyword, the program interprets the selection chosen. The selection may be interpreted as a command or may lead to a sub-menu where more keywords are displayed.

The console applies the change to the console display screen, and as described above the same changes are sent to the workstation where the console window is updated with said changes.

In the manner just described, the same user interface for controlling the host is available at a remote workstation as is presented at the local operations console.

The foregoing objectives, and other more detailed objectives of the invention will become apparent from a consideration of the Drawings and the following detailed description of the preferred embodiment of the invention.

BRIEF DESCRIPTION OF THE DRAWINGS

FIG. 21 is a flow chart for the Console Window Opened Demon which is fired when a CONSOLE SESSION WINDOW IDENTIFIER 1156 attribute is asserted a known value;

FIG. 22 is the flow chart for the Request Console Window processing that sends a message to the Console 12 to open a Console Window;

FIG. 23 is a flow chart for the Close Console Window function that is invoked by the Graphical Tool-kit when the Graphical Tool-kit detects that a user has manipulated a graphical data object and desires that a Console Window be closed;

DETAILED DESCRIPTION OF THE PREFERRED EMBODIMENT

The improvement over the prior art can best be understood by studying the following Operational Description of the Prior Art and then studying the description of the Operational Description of the Preferred Embodiment

A. Operational Description of the Prior Art

Figure 1:
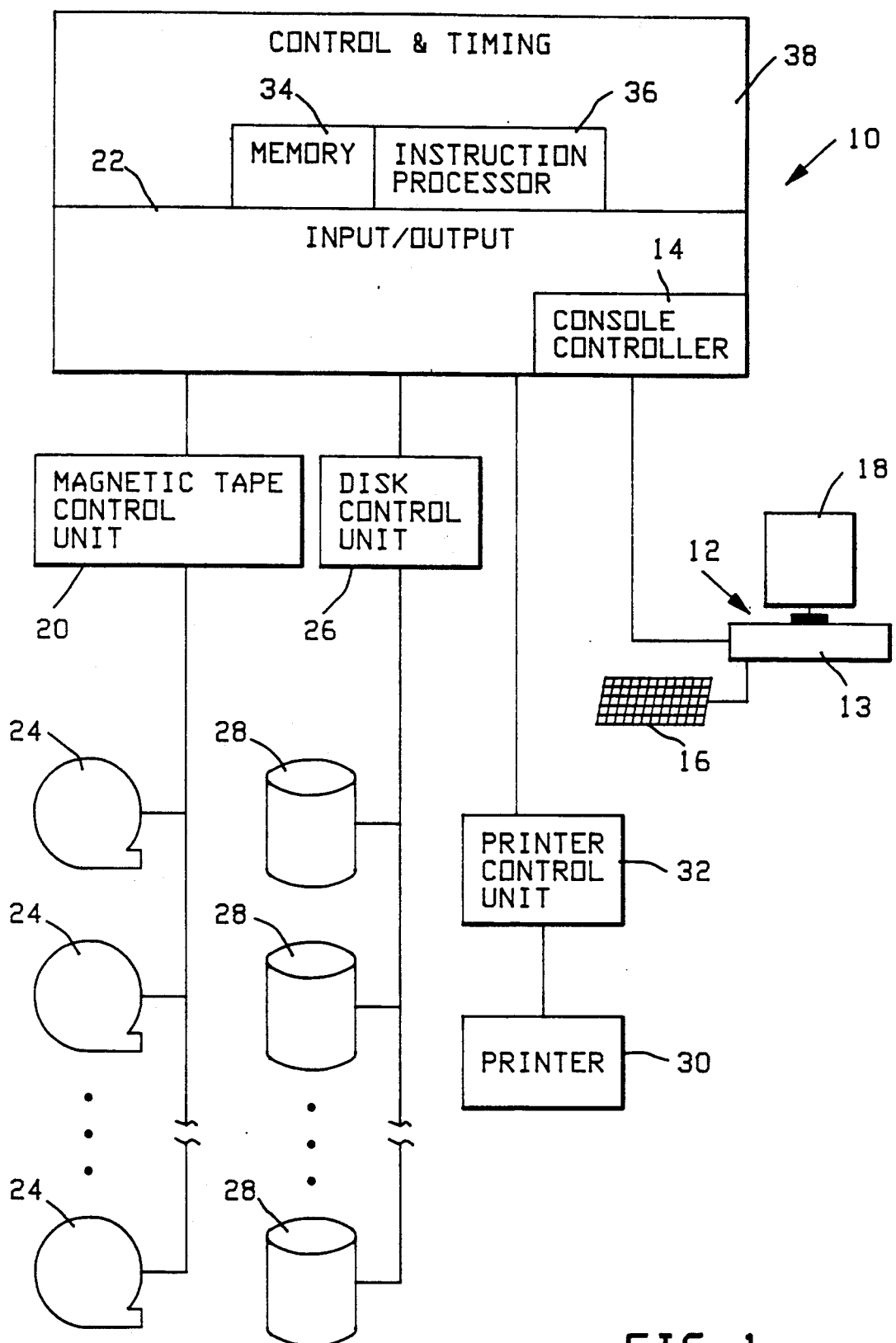
FIG. 1 is a diagram showing the type of data processing environment requiring operator control.

FIG. 1 is a diagram showing the type of data processing environment requiring operator control. Included in the overall environment is a Host Processor 10 that is controlled via an Operation Console 12. The Operation Console 12 consists of a Processing Unit 13 coupled to the Console Controller section 14 of the Host Processor 10. Coupled to the Processing Unit 13 is a Keyboard 16 and a Video Display Terminal 18 for Host Processor 10 operation input and output. A Tape Control Unit 20 is coupled to the Input/Output section 22 of the Host Processor 10 and controls Tape Drives 24. Likewise, Disk Control Unit 26 is coupled to the Host Processor Input/Output section 22 and controls Disk Drives 28. Printer 30 is coupled to Printer Controller 32, which in turn is coupled to the Host Processor Input/Output section 22.

It should be understood that the illustrated data processing environment is merely an example, and that various combinations of peripheral devices, including others such as proprietary terminal communications devices, non-volatile memories, optical disks, and so forth, may be substituted for those shown in FIG. 1.

A Host Processor 10 typically includes a Memory section 34 for storing programs and data; an Instruction Processor 36 for executing instructions specified by the programs; a Control and Timing section 38 for controlling operation of the Host Processor; and an Input/Output section 22 for transmitting and receiving data and control parameters to and from peripheral devices. The Operation Console 12 provides the interface between the Host Processor and the Host Processor operator.

Figure 2:
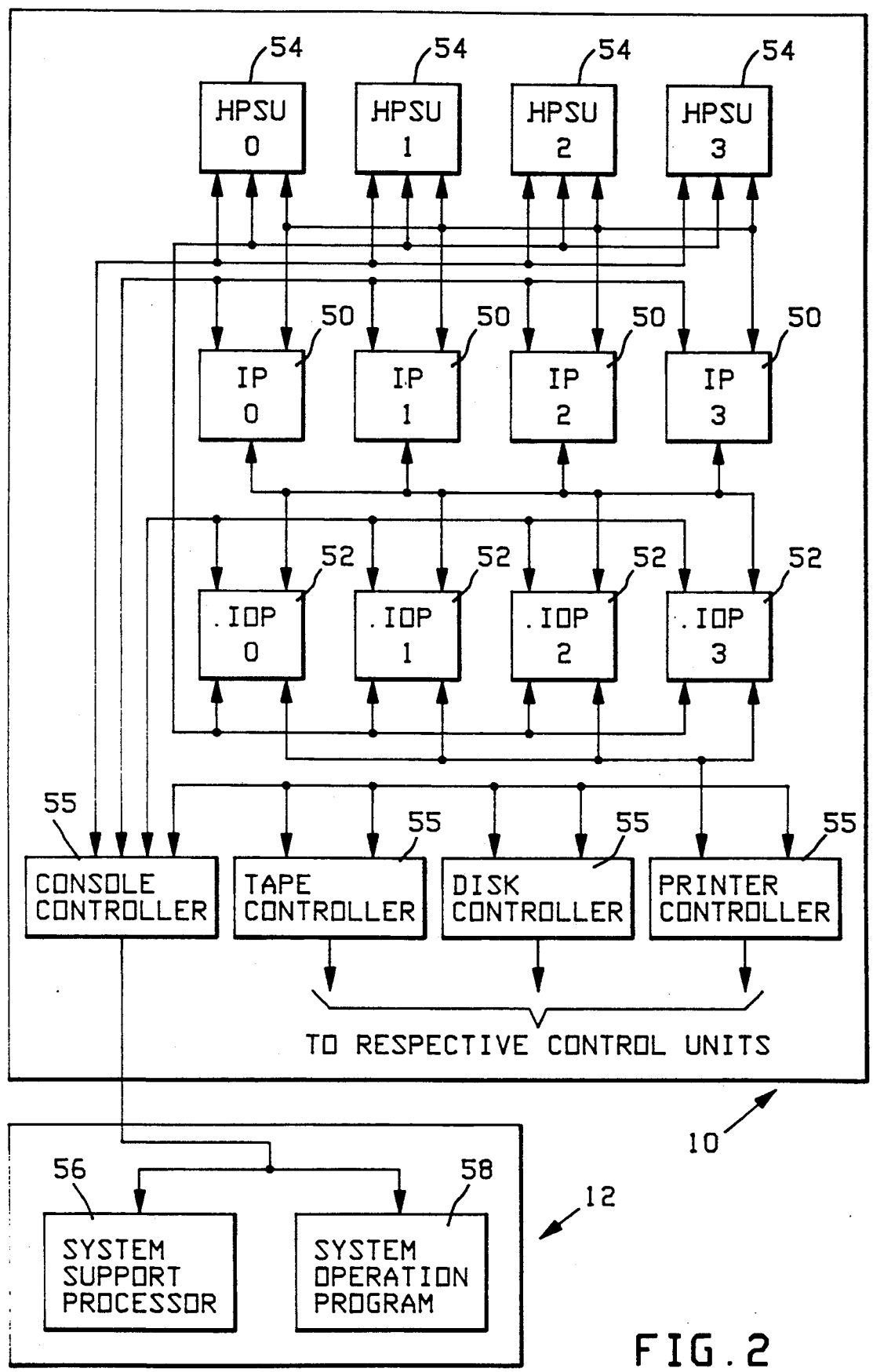
FIG. 2 is a block diagram of a Host Processor which an operator controls through a coupled Operation Console.

FIG. 2 is a block diagram of a Host Processor 10 which an operator controls through a coupled Operation Console 12. The 2200/600 Series data processing system which is commercially available from the Unisys Corporation is an example of a Host Processor requiring an Operation Console 12.

The Host Processor 10 in FIG. 2 includes four Instruction Processors IP0 through IP3, each labelled 50. The IP provides instruction execution, virtual machine capability, and two cache memories (not shown). Each IP is functional to call instructions from Memory, execute the instructions, and, in general, do data manipulation.

In conjunction with the IPs, from one to four Input/Output Processors IOP0 through IOP3, each labelled 52, can be utilized. The IOPs handle all communications between the IPs 50 and the Memory systems 54 and the peripheral subsystems 55. In this type of configuration, the IPs function as the central processing units, and the IOPs act as CPUs to handle all of the communications.

From one to four high performance storage units, HPSU0 through HPSU3, each labelled 54, are shown for use as addressable high-speed storage. Each HPSU provides four instruction processor (IP) ports for providing communication paths to the IPs, both for reading and writing. Each HPSU also includes four input/output processor (IOP) ports for interconnection with the IOPs.

The overall Host Processor maintenance and supervision is accomplished through an Operation Console 12. Prior art embodiments of the Operation Console consisted of application programs executing on a computer, with the computer and associated programs dedicated to the task of providing an operator interface for Host Processor control. From this point forward, the Operation Console will simply be referred to as the "Console" for brevity. It should be understood that in the preferred embodiment, the Console is a programmable digital computer which is a member of the class of computers commonly referred to as Personal Computers.

Generally, Host Processor operation using a Console entails the Host Processor sending status and diagnostic messages to the Console, the Console displaying the message for the operator, and the operator entering commands at the console which are sent to the Host Processor. In the Console of the preferred embodiment, various application programs execute to process messages sent from the Host Processor and to send operator input messages to the Host Processor.

One of the application programs executing on the prior art Console and providing an operator interface for Host Processor operations is the System Support Processor (SSP) 56. The SSP provides direct access to all units of the Host Processor, and in general performs the function of a hardware maintenance panel for the Host Processor. The display and setting of information, activation of Host Processor maintenance facilities, selecting modes of operation, and similar operations are performed through the SSP. In particular, the SSP provides the operator with an interface to the IPs, IOPs HPSUs and peripheral subsystems.

With the SSP Host Processor initialization commands the operator can select which IPs, IOPs, and HPSUs to include in the operating system environment. The SSP can also be used for initializing the Host Processor operating system load, fault analysis, Host Processor application program control, and diagnostic testing.

Once Host Processor initialization is complete and the Host Processor operating system is loaded and executing, the System Operation Program 58, executing on the Console, provides the operator with an interface to the Host Processor operating system. The operator can control program execution, printer queues, tape drive and printer availability and initiation, and installation of host software packages (e.g., communication packages, database packages, and so forth) with the System Operation Program operator interface.

In addition to Host Processor operating system control, the System Operation Program 58 also provides an operator interface which is easy to use. The operator interface provided by the System Operation Program is commercially available for Operation Consoles compatible with the 2200 Series Host Processors, also commercially available from the assignee of the present invention. The easy to use operator interface is sold as SHIELD Friendly Console. The SHIELD Friendly Console provides pull-down menus, context sensitive help, message recall and command recall. A brief description of these features follows.

The pull-down menus provide the Host Processor operator with a method to enter operating system commands without having to memorize the particular syntax of the commands. The Host Processor operator is presented with a menu containing a list of operating system objects upon which action could be taken (e.g., runs, queues, printers, peripherals, and so forth). Upon selecting an object, the operator can choose which action to take (e.g., up, down, reserve, and so forth). When the menu system needs specific information, the operator is prompted with a fill-in-the-blank form into which the operator can enter the desired parameter. Using the menu system, operating system commands can be easily built and sent to the Host Processor operating system.

The Shield Friendly Console also provides context sensitive help which provides the operator with information on the function requested. When using the menu system, help can be obtained by pressing a predefined function key on the Console keyboard. The particular help message displayed for the user is dependent upon the active position in the menu system. In this sense the help is context sensitive.

Additionally, the SHIELD Friendly Console provides a method for the operator to review operating system messages which have scrolled off the display. A further feature of the SHIELD Friendly Console gives the operator the ability to recall previously entered commands without having to rebuild the command from scratch.

An enhancement to the prior art Console included the addition of a communications network interface. The network interface for the prior art Console consisted of an application program and a commercially available hardware/software package from the Excelan Corporation which supports the Transmission Control Protocol/Internet Protocol (TCP/IP) for Ethernet. The commercially available software is compatible with the Xenix Operating System which is commercially available from the Santa Cruz Operation, Incorporated. The network communication capability which was added to the Console enabled communication with the Console from a Workstation which was also coupled to the network. The application program part of the network interface that manages network connections between the Console and Workstation programs, and provides a message passing mechanism between the same.

The message passing service in the prior art console includes two features. First, messages originating from either the Console or the Host Processor can be sent to a program executing on another computer (referred to as a "Workstation" in this description) coupled to the same network to which the Console is coupled. Second, a Workstation can send input messages to an application program (SSP or System Operation) on the Console with the input messages ultimately sent to the Host Processor. The message passing capabilities provided by the prior art network interface will be referred to as the "raw message service".

Figure 3:
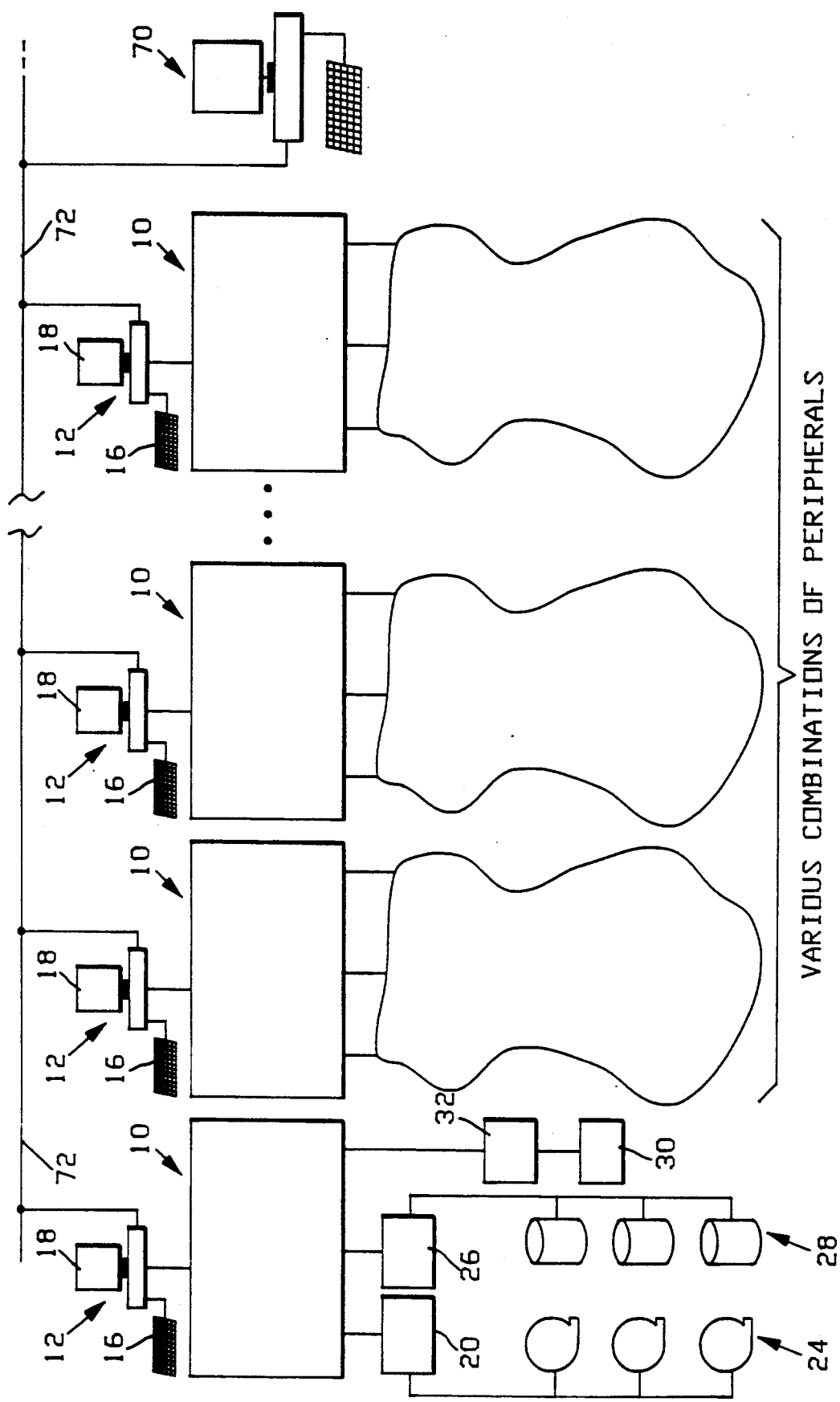
FIG. 3 illustrates a data processing environment in which the prior art raw message service could be used to centrally control and operate a plurality of Host Processors.

FIG. 3 illustrates a data processing environment in which the prior art raw message service could be used to centrally control and operate a plurality of Host Processors. Multiple Host Processors 10 are shown coupled to Disk Control Units 26, Disk Drives 28, Tape Control Units 20, Magnetic Tape Drives 24, Printer Controllers 32 and Printers 30. Each Host Processor can be controlled from its coupled Console 12. Messages from a Host Processor are sent to its Console and the Console software displays the messages on the Console Video Display Terminal 18. The operator can enter input commands, and effectively control the Host Processor, at the Console Keyboard 16.

With the prior art network interface available on the Console, a program running on Workstation 70, which is coupled to a Communications Network 72, can establish a software connection with a Console 12. This connection could then be used to access the raw message service. By establishing connections to a plurality of Consoles 12 on the Network 72, the Workstation program could access the raw message service of a plurality of Consoles, and hence, control multiple Host Processors 10.

Figure 4:
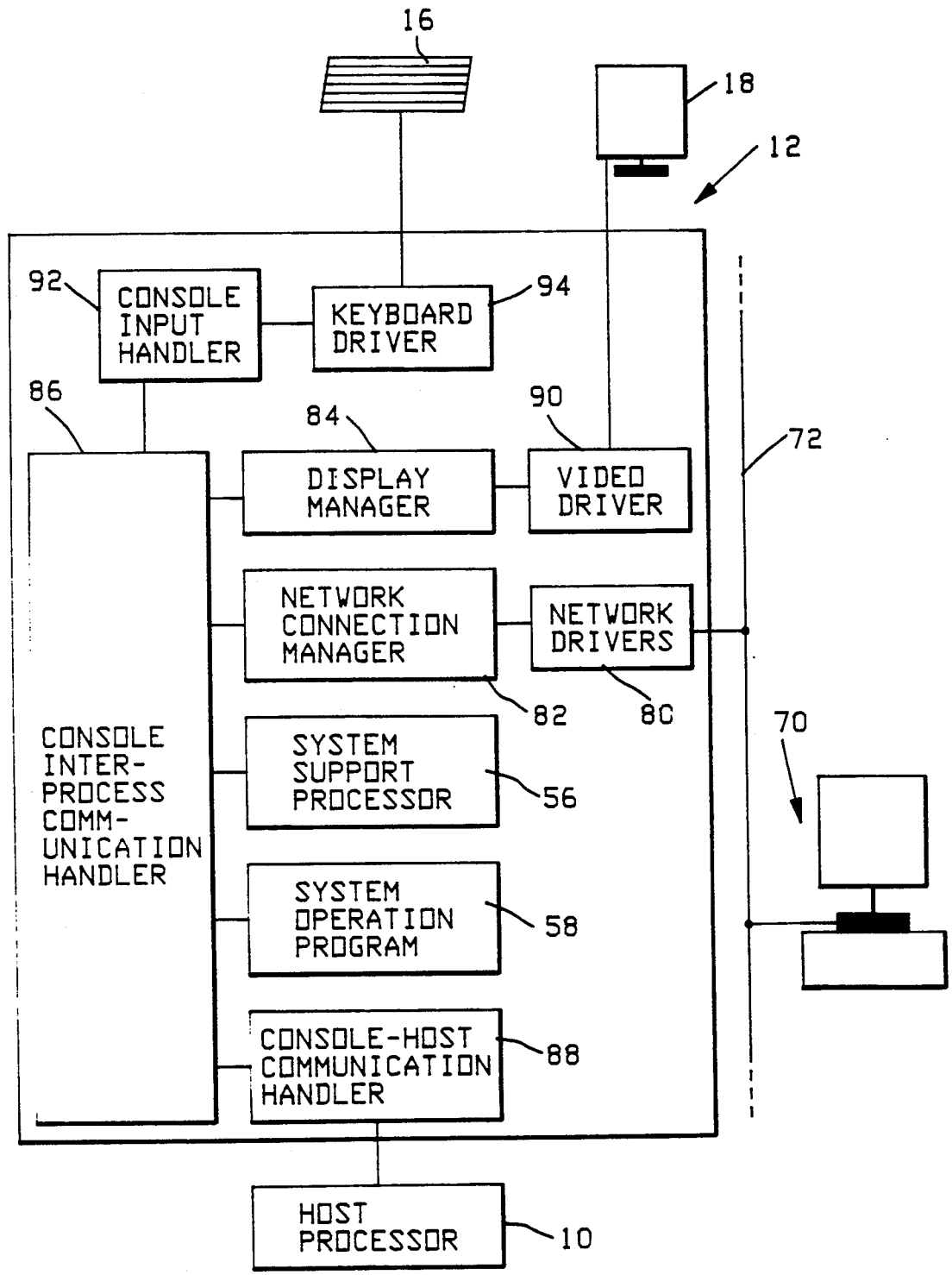
FIG. 4 is a block diagram of prior art software embodying a Console with the raw message service capability.

FIG. 4 is a block diagram of prior art software embodying a Console with the raw message service capability. The Network Drivers 80 are used to interface with the Network 72, and are part of a commercially available hardware/software package which supports the TCP/IP protocol for Ethernet on personal computers as described earlier.

The Network Connection Manager 82 on the Console provides network management services for the Console. This software component serves as the interface between programs running on the Console 12 and programs running on a Workstation 70 to which the Console programs may be providing raw message service.

The Display Manager 84 provides display services for the application programs running on the Console. The prior art Console display characteristics are described to acquaint the reader with the Display Manager terminology. With the prior art Console, different areas of Host Processor operation are handled by various application programs executing on the Console. Each of these application programs has an associated software defined display screen which is the means through which an operator views input entered to the application program and the means by which the application program displays output to the user. Because it is possible to have multiple application programs executing on the Console, with each program having a dedicated display screen, a means is necessary to provide access to and management of the multiple display screens. The way this is accomplished is to make one and only one display screen visible on the Console Video Display Terminal at any one time. When a display screen for an application program is visible, it is referred to as being "exposed." Exposure of a display screen allows the operator to enter input to the application program and view output from the application program. The prior art Console program which manages exposure of display screens and input and output for the display screens is called the Display Manager.

The display screen for a particular application program can be exposed by pressing a predetermined function key on the Console Keyboard 16. When a function key assigned to an application program is pressed, the display screen associated with the application program is exposed on the Console Video Display Terminal and input to the Console application program associated with the display screen can be entered.

The application programs for which the Display Manager handles input and output are the System Operation program 58 and the System Support Processor 56. Operator input entered at the Keyboard 16 is read by the Console Input Handler 92 and made available by the operating system Keyboard driver 94. The Console Input Handler 92 sends keyboard input requests to the Display Manager 84 through a Console Interprocess Communication Handler 86. The Display Manager 84 then processes the input accordingly, one possibility being that an input character string is sent to a Console application program such as the System Operation Program 58.

Services for passing messages between programs on the console are provided by the Console Interprocess Communication Handler 86. Programs on the Console which provided message service to the Workstation 70 can send the messages to the Network Connection Manager 82 via the Console Interprocess Communication Handler 86.

As an example, a message from the Host Processor 10 operating system is processed by the System Operation Program 58 and is ultimately displayed on the display screen associated with the System Operation Program. The message from the Host Processor 10 is sent to the Console-Host Communication Handler 88 on the Console 12. The Console-Host Communication Handler sends the message to the System Operation Program 58 via the Console Interprocess Communication Handler 86. Once the System Operation Program has decoded the message, it sends an update request to the Display Manager 84. The Display Manager then applies the update to the display screen associated with the System Operation Program. If the System Operation program's display screen is currently displayed on the Console Video Display Terminal 18, the update is made to the Video Display Terminal through the Video Display Driver 90.

Continuing the example, if a program executing on the Workstation 70 is receiving raw message service from a Console program, such as the System Operation Program 58, part of the processing of the System Operation Program includes sending the message to the Workstation program which is subscribing to the raw message service. This involves sending the message to the Network Connection Manager 82 via the Console Interprocess Communication Handler 86. After receiving the message, the Network Connection Manager sends the message to the program on the Workstation 70 via the Network Drivers 80.

B. Operational Description of the Preferred Embodiment

Figure 5:
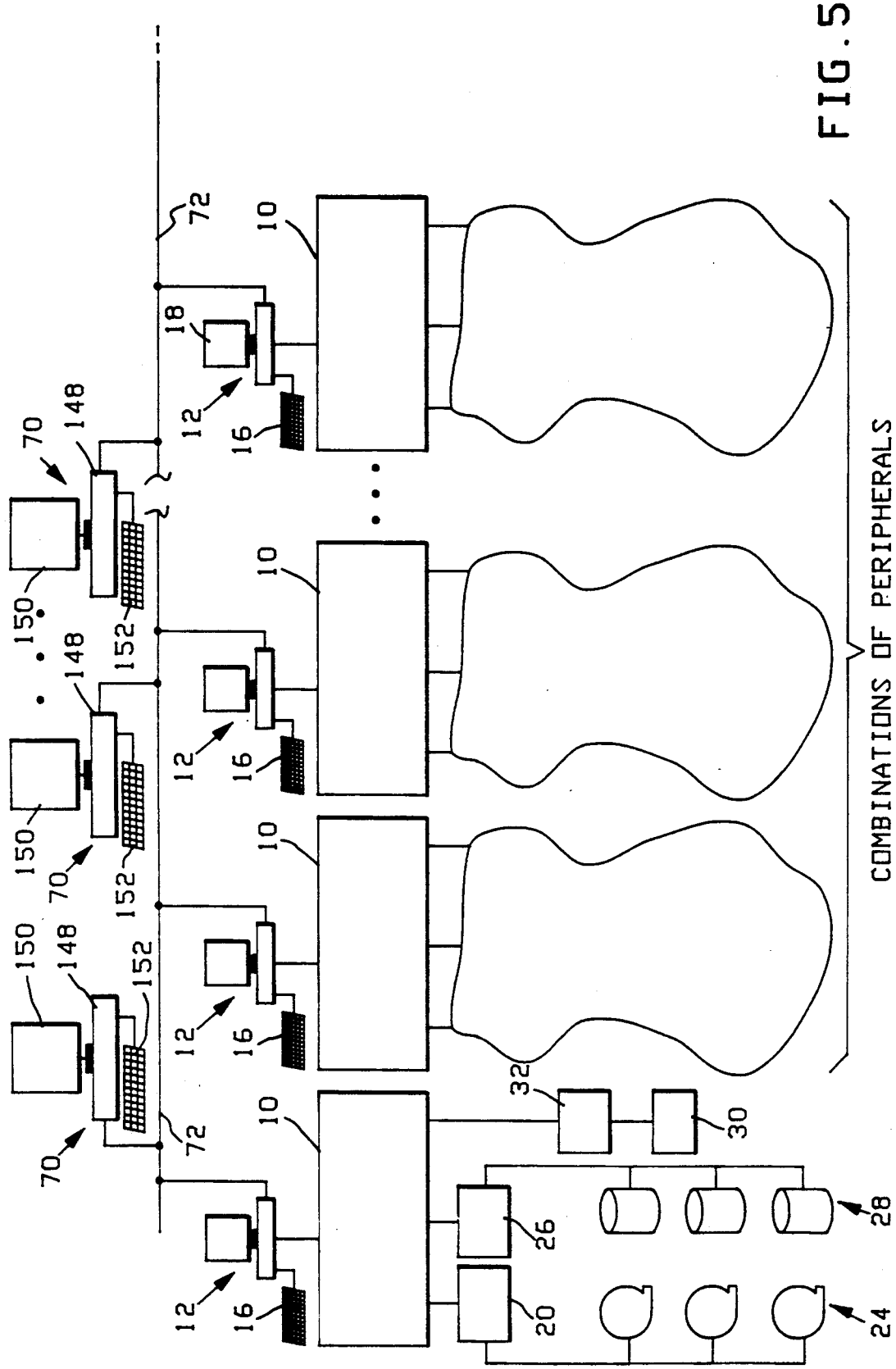
FIG. 5 is a pictorial diagram of a data processing environment in which the present invention could be utilized.

FIG. 5 is a pictorial diagram of a data processing environment in which the present invention could be utilized. Included in the environment are Host Processors, shown collectively as 10, Controllers 20, 26, and 32, Peripheral Data Storage Devices 24 and 28, Printers 30, and Consoles 12. Each Console is coupled to a Communications Network 72 to facilitate remote operation. Remote operation of the Host Processors is accomplished from Workstations, shown collectively as 70, which are coupled to the same Network 72 as the Consoles. The configuration shown in FIG. 5 is essentially the same as that shown in FIG. 3. However, multiple Workstations are shown in FIG. 5 to signify that control of a single Host Processor can be exercised from a plurality of Workstations.

The Workstations 70 shown in FIG. 5 are used to remotely control and monitor the Host Processors. In the preferred embodiment, the Workstation consists of a programmable Processing Unit 148 with computing capabilities on a scale comparable to the commercially available Unisys U6000/WS workstation. Because the invention provides for control of multiple Host Processors from a single Workstation a large Video Display Terminal 150 is coupled to the Processing Unit 148 for displaying output from Processing Unit 148. The large Video Display Terminal facilitates interaction with multiple Consoles. While smaller Video Display Terminals could be used to practice the invention, a Video Display Terminal whose display portion measures at least 19 inches is preferred.

A Keyboard 152 is coupled to the Processing Unit 148 for allowing an operator to input character data. A Keyboard similar in style to that used on the Console is used at the Workstation to maintain consistency between the user interface at the Workstation and the user interface at the Console. It should be recognized that alternative input means could be used to practice the invention. For instance, if console input is accomplished through a voice input means, the workstation could have a similar voice input means in addition to, or in place of the keyboard.

The Communications Network 72 is the means through which the Consoles and Workstations communicate. A network similar to Ethernet, as defined by IEEE standard 802.3, could be used to practice the present invention. It should be noted that the invention is not limited in use to Local Area Network (LAN) configurations; it could also be practiced in Wide Area Network (WAN) configurations.

Figure 6:
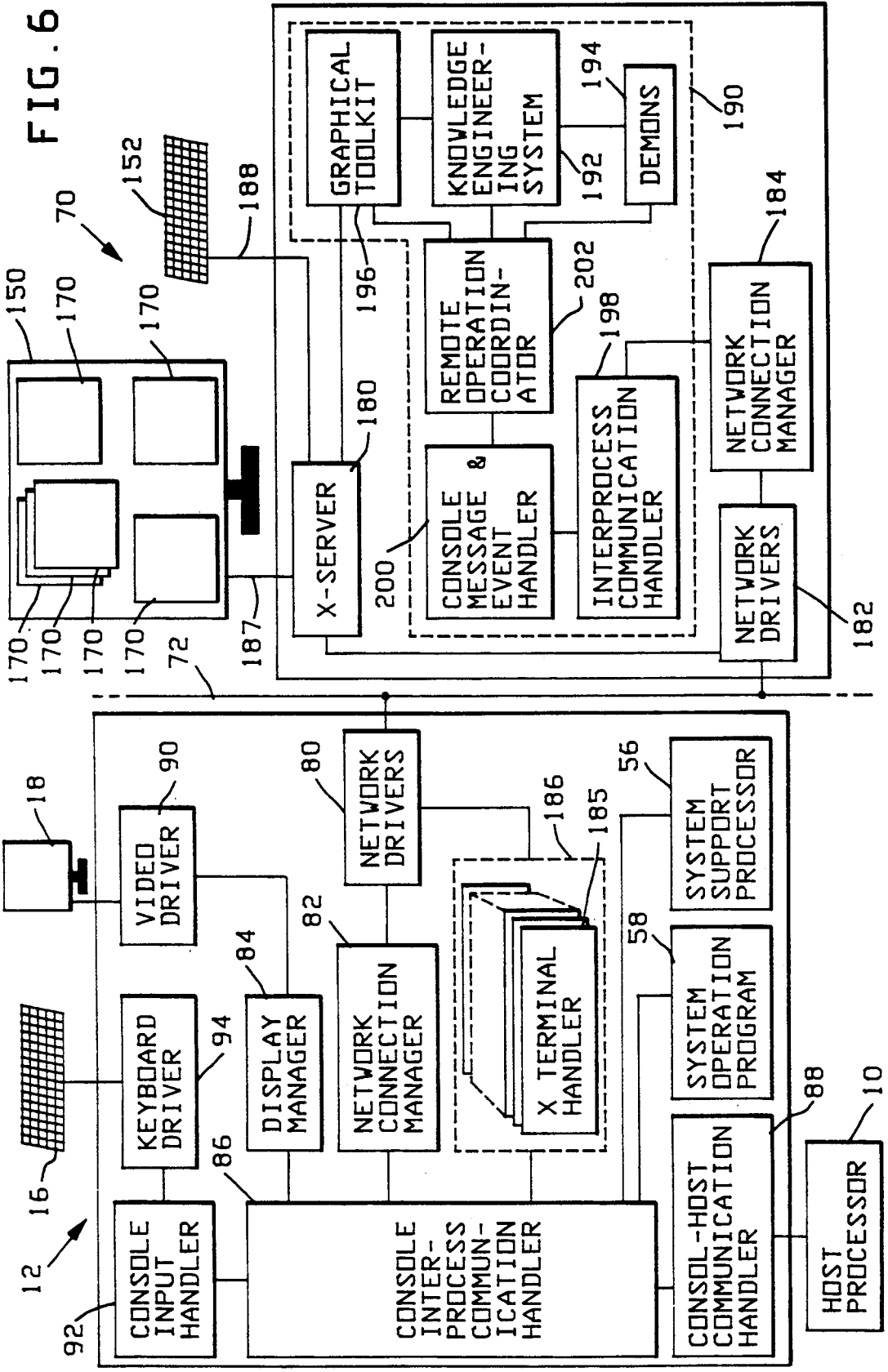
FIG. 6 is a block diagram of the software of the present invention.

FIG. 6 is a block diagram of the software of the present invention. A Console 12 and Workstation 70 are shown coupled to a Communications Network 72, and a Host Processor 10 is coupled to the Console. As in the prior art, the Console is a programmable digital computer which handles Host Processor-Console communication and Console-operator interaction. Operator interaction with the Console is accomplished through a Keyboard 16 and Console Video Display 18.

Coupled to the Workstation 70 is a Workstation Video Display Terminal 150 for visual output and a Keyboard 152 for user input. A number of Windows 170 are displayed on the Workstation Video Display Terminal 150. In a typical scenario, there may be multiple programs executing, with each program having a dedicated Window for user interaction. For example, there could be a Window for editing text files, a Window associated with a spreadsheet application, a Window associated with a database application, and so forth. A Window provides a means of communication between a user and a program.

In the present invention, one or more of the Windows 170 shown on the Workstation Video Display Terminal 150 may be associated with a Consoles. A Window associated with a Console will be referred to as a Console Window. A Console Window is a replica of that which is displayed on the Console Video Display Terminal 18. Because the Console Window 170 contains an identical replica of that which may be displayed on the Console Video Display Terminal, and input entered at the Workstation Keyboard 152 is processed on the Console just as if the input were entered at the Console Keyboard 16, an operator at the Workstation 70 has the same control over the Host Processor as the operator would have at the Console 12.

The operation of the preferred embodiment will first be described with a functional overview of the software components shown in FIG. 6, and a comparison of the software components with those found in the prior art. Following the functional overview is a more detailed operational description.

Beginning with the functional overview, the Console application programs which provide the Host Processor operation capabilities are the same as those described in the section "Operational Description of the Prior Art". In particular, the Console-Host Communication Handler 88 handles the low level interface between the Host Processor 10 and the Console; the Console Interprocess Communication Handler 86 provides a message passing interface for the various programs executing on the Console; and the System Operation Program 58 and System Support Processor 56 provide the software operator interface for operation of the Host Processor. Operationally, the System Operation Program (SOP), System Support Processor (SSP), and Console Interprocess Communication programs are the same as that described in the prior art. Applying the example set forth in the prior art description, the Console of the preferred embodiment operates identically to the prior art Console.

The basic hardware and software components necessary for network communication in the preferred embodiment are the same as those found in the prior art. In particular, a commercially available hardware/software package from the Excelan Corporation, which supports the Transmission Control Protocol/Internet Protocol (TCP/IP) for Ethernet and is compatible with the Xenix operating system, is used on the Console. The software part of this package is shown as Network Drivers 80 on the Console 12. The hardware/software package supporting the Communications Network interface on the Workstation is part of the commercially available U6000/WS Workstation from the Unisys Corporation and shown as Network Drivers 182.

The Network Connection Manager 82 on the Console and the Console Connection Manager 184 on the Workstation are similar in operation to the prior art. These programs cooperate in establishing and maintaining a software coupling between programs on the Console and programs on the Workstation. In the preferred embodiment the Network Connection Manager is capable of accepting TCP/IP socket connections from a plurality of workstations and sending messages to those Workstations having socket connections.

The Console Connection Manager 184 on the Workstation acts as a software connection manager, message translator, and message multiplexer between the software on the Workstation and software on the Console. Upon request from a Workstation software component, the Console Connection Manager 184 establishes and maintains a software connection with the Network Connection Manager 82 on a Console. Messages sent from a Console are translated into a format readable by Workstation software components and routed appropriately.

The Console Input Handler 92 is the same as that present in the prior art Console. Namely, the Console Input Handler is the program which reads input from the Console Keyboard 16. After reading the input, the Console Input Handler sends the input character through the Console Interprocess Communication Handler 86 as a request to the Display Manager 84.

The Display Manager 84 of the preferred embodiment functions much the same as the Display Manager of the prior art Console. However, the Display Manager of the present invention incorporates features from the commercially available X Window System. By using capabilities available in the X Window System, the Display Manager is able to duplicate output displayed on the Console Video Display Terminal and Console input characteristics at a Workstation, thereby providing remote operation.

The X Window System is a windowing system which permits a program running on one computer, which is coupled to a Communications Network 72, to define and use a Window 170 which is displayed on the Video Display Terminal 150 of a second computer 70 which is also coupled to the network. In the X Window System argot, the program defining the window is the "client" and the program executing on the computer coupled to the video display on which the window is displayed, and responsible for displaying the Window on the hardware device, is called the "X-server" program. In the present invention, the Console Display Manager is the client program. The Display Manager 84 sends Console Window updates to the X-server program 180.

The X-server 180 is typically part of the X Window System, and is specifically adapted to the hardware and operating system characteristics of the computer on which the X-server program is executing. The X-server program receives window update messages from its client programs and makes the requested updates to the respective windows. The X-server also directs any input associated with the windows to the respective client programs. In this way the X-server acts as a software interface between the window and the client program associated with the window. Introductory chapters in the Xlib Programming Manual: for Version 11 of the X Window System by Adrian Nye and published by O'Reilly and Associates, Inc., Sebastapol, CA 1990, further describe the X Window System and can be consulted for a more detailed explanation.

The means through which the Display Manager maintains a Console Window 170 on a Workstation 70 is by starting an X Terminal Handler 185. An X Terminal Handler 185 makes updates to a Console Window 170 as requested by the Display Manager 84, and processes Console Window events sent from the X-server 180 on the Workstation. A separate X Terminal Handler is started for each Console Window which is started on a Workstation. Dashed block 186 represents a plurality of X Terminal Handlers started for managing a plurality of Console Windows.

While not shown in FIG. 6, it should be noted that the operating system for the Console 12 in the preferred embodiment is the same as that used in the prior art console. Namely, the Xenix operating system, commercially available from the Santa Cruz Operation, Incorporated, is used for its support of the multi-tasking program environment necessary for the Console application programs. The Keyboard Driver 90 and Video Display Driver 94 on the Console 12 are part of the Xenix operating system. While input and output drivers are not shown on the Workstation 70, it should be understood that the coupling 187 between the X-Server 180 and the Workstation Video Display Terminal 150, and the coupling 188 between the X-Server 180 and the Workstation Keyboard 152 is accomplished, in part, through input and output drivers which are part of the operating system executing on the Workstation.

Dashed block 190 on the Workstation represents a collection of software modules which provide the framework for controlling multiple Host Processors 10 from the Workstation 70. Functionality provided by the present invention includes: initiating connections with selected consoles, software initialization, providing a user interface to open and close console windows, and a user interface for detecting alarm conditions emanating from a Console. The software modules in block 190 are implemented using the Knowledge Engineering System II (TM), Strategic Networked Application Program (TM), and various C language routines. A discussion of the role each piece of software is presented below.

The Knowledge Engineering System II (KES II) 192 is an expert system development platform which is commercially available from Software Architecture and Engineering, Inc., Arlington, VA. While an expert system tool-kit is used to model data in this embodiment, it should be understood that the claimed invention is neither an expert system nor requires an expert system tool-kit to define a working embodiment within the scope of the present invention. Because the present invention is not an expert system, only a limited understanding of the KES II terminology is required to understand the embodiment presented. The particular KES II terms used in the remainder of this discussions are: "attribute", "class", "data model", and "demon". Each is briefly defined below.

In KES II, an attribute is a piece of knowledge about a particular data object defined in the system. The attributes of an data object will take on various values during system runtime. Additionally, when attributes take on a user programmed value, the system can be programmed to react upon the changing of the attribute.

A class is a group of data objects which share a common set of characteristics. Every object in a class will have its own value for these characteristics; but all objects will have in common the presence of these characteristics. For example, a class of data objects known as "CONSOLES" could have a characteristic "ATTENTION REQUIRED". There may be a plurality of CONSOLE data objects in existence during system runtime, each with its own distinct ATTENTION REQUIRED attribute.

Class hierarchies may also be defined in KES II. For example, CONSOLE WINDOW, BAR CHART, and TABLE are "subclasses" of the class WINDOW. A subclass inherits the attribute definitions of the parent class.

The KES II data model is the collection of class, subclass, and attribute definitions defined by a particular application program, and the relationships between the same. Once the data model is defined, objects can be created which conform to the definitions set forth in the data model.

In KES II, Demons 194 can be thought of as event handlers. Demons monitor an attribute and take action in response to a change in the value of the monitored attribute. Demons are typically made up of two parts: the guard condition that watches the attribute for a given value and the body of actions that will be executed when the guard evaluates to true. Continuing with the preceding example, there could be a demon defined as: WHEN a console's attention required attribute is true, THEN take appropriate actions. In this case the guard is the condition set forth between the "WHEN" and the "THEN". The body of actions consists of the instructions following the "THEN". The body of actions may make changes to other attributes which in turn may activate other demons.

A second software tool-kit used in supporting remote operation is the Strategic Network application Platform (SNAP). This software tool-kit is commercially available from Software Architecture and Engineering, Inc., Arlington, VA. In FIG. 6, SNAP is represented as the Graphical Tool-kit 196 and the Interprocess Communication Handler 198.

The Graphical Tool-kit 196 portion of SNAP provides the graphical displays for the remote operation system. Menus, tables, bar charts, and topological displays can be constructed with the Graphical Tool-kit. The graphical displays are described as data objects in the KES II data model. KES II and SNAP are coupled such that changes in the graphical display data objects are reflected on the Workstation Video Display Terminal 150. The Graphical Tool-kit affects changes on the Video Display Terminal through the X-Server 180.

The second SNAP component supporting remote operation is the Interprocess Communication Handler 198. The Interprocess Communication handler provides a means for sending messages between the Console Communication Software Interface 200 and the Console Connection Manager 184. It provides functions for establishing and destroying a connection between the Console Communication Software Interface 200 and the Console, and sending and receiving messages between the same.

The Remote Operation Coordinator 202 is the software module which initializes the KES data model, contains functions which are invoked by demons, and contains functions which are invoked in response to Graphical Tool-kit 196 events or events detected by the Console Message and Event Handler 200.

The Console Message and Event Handler 200 consists of functions for providing communication between the Remote Operation Coordinator 202 and the Console Connection Manager 184. The Console Message and Event Handler is the software through which the Remote Operation Coordinator 200 sends a request to start a Console Window. The Console Message and Event Handler also receives messages from the Consoles and passes them to the Remote Operation Coordinator for further processing.

Those skilled in the art will recognize that the functionality entailed by the Remote Operation Coordinator could be duplicated in other embodiments, without use of the KES system and SNAP interface, and still fall within the spirit of the present invention. In this embodiment KES and SNAP were chosen for reasons beyond the scope of the present disclosure. To supplement the preceding functional overview, the following operational description is provided.

The Display Manager 84 provides display services for the application programs running on the Console. While not part of the present invention, it is helpful to understand the data structures through which the Display Manage communicates with the application programs and how they relate to the data structure the Display Manager uses for the present invention. "Virtual Screens", "Sub-Screens", and "Terminal Screens" are used by the Display Manager to coordinate input and output for each of the application programs. Each term is described below.

A set of Virtual Screens is used by an application program to define its display screen. As described earlier, a display screen is the means through which an operator views input entered to the application program and the means by which the application program displays output to the user. An application can define one or more Virtual Screens for displaying output or receiving input. The use and operation of these Virtual Screens is identical to that found in the prior art Console as described in the "Operational Description of the Prior Art" section of this application.

Sub-Screens are defined by an application program to be a subset of a Virtual Screen. When manipulating a sub-screen, an application program sends a mapping coordinate to the Display Manager indicating the relative position of the sub-screen on its display screen. This too is an operational characteristic found in the prior art Console. Those skilled in the art will recognize that alternate means exist to facilitate coordination of output between application programs and a Display Manager type program.

A Terminal Screen is the data structure used by the Display Manager to hold the current state of an exposed display screen. For each Video Display Terminal on which an application program has its display screen exposed, a Terminal Screen data structure is created to hold the current state of the exposed display screen. For example, in FIG. 6 a Terminal Screen would be created for the Console Video Display Terminal 18, and for each of the Workstations 70 on which there is a Console Window open. The content of a Terminal Screen is driven by the mapping of the Sub-Screens of the Virtual Screens to the Terminal Screen by the Display Manager.

Figure 7:
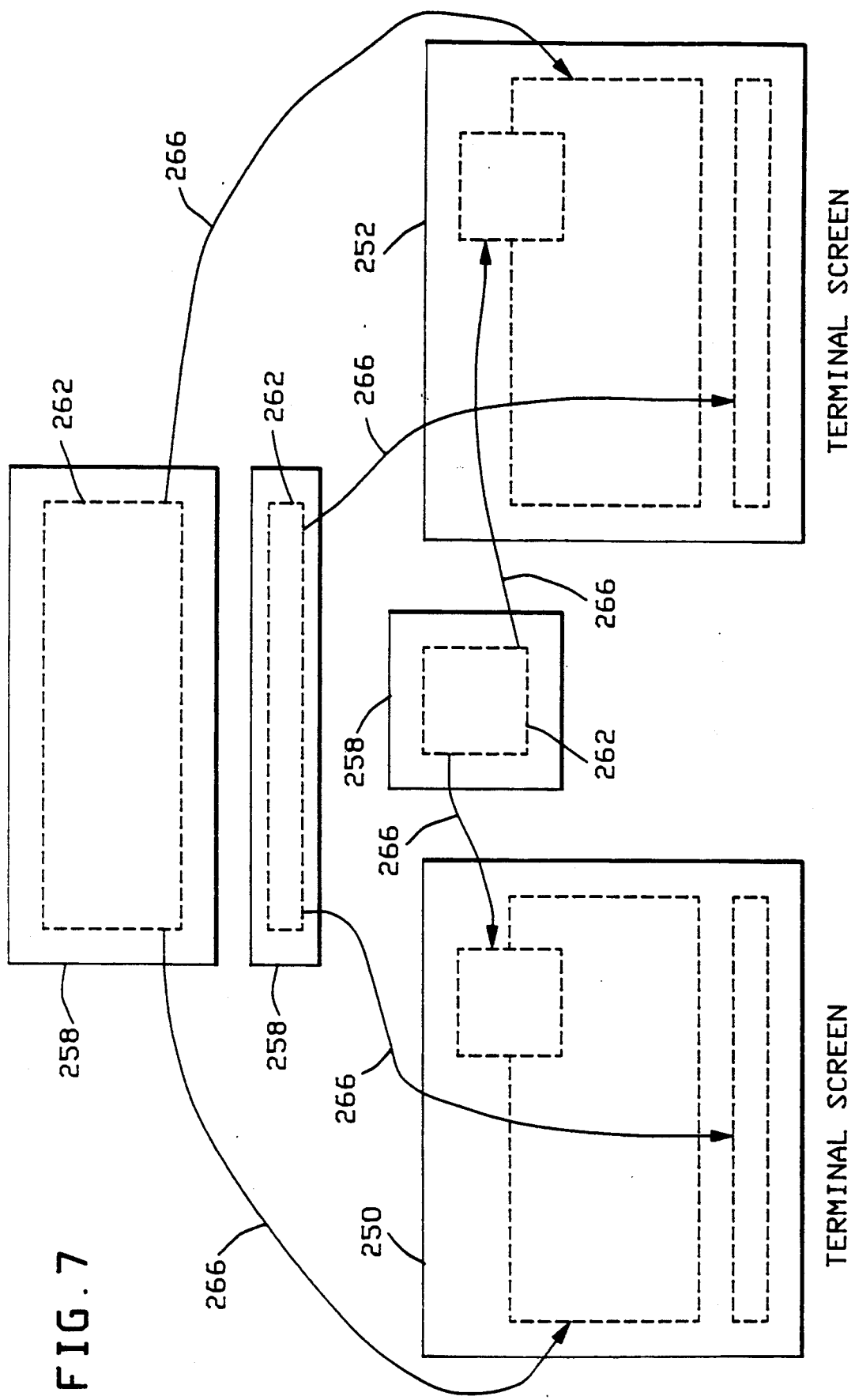
FIG. 7 shows the relationship between Virtual Screens, Sub-Screens, and Terminal Screens.

FIG. 7 shows the relationship between Virtual Screens, Sub-Screens, and Terminal Screens. Two Terminal Screens, 250 and 252, are created when a display screen for an application program is displayed on two Video Display Terminals. While only two Terminal Screens are shown in the figure, it should be noted that the two shown are but an example and that there could be more than two Video Display Terminals on which a Console Display Screen is displayed, and therefore, more than two Terminal Screens maintained by a Display Manager.

An application program, such as the System Operation Program 58, defines a set of Virtual Screens, shown collectively as 258. Each of the Virtual Screens has a Sub-Screen 262 defined by the application program, and the application program defines a position for the Sub-Screen on the Terminal Screen 250 where the Display Manager displays the Sub-Screen. As the application program manipulates data in each of its Virtual Screens, the Display Manager maps the changes to each Terminal Screen 250. The mapping is represented by lines 266. The application program is oblivious to the fact that the Sub-Screens are mapped to multiple Terminal Screens. After the Display Manager maps data to each of the Terminal Screens, the data is transferred to the respective Video Display Terminals.

In addition to the Host Processor control provided by the Console application programs, in the preferred embodiment the Display Manager provides the capability for a user to individually control each of the Console Windows 170. In particular, where a Console has a Console Window displayed on a plurality of Workstations, the user can select one of the Console Windows from which input will be exclusively received. This provides the capability to stop users from entering conflicting input. The Display Manager communicates with a user through Console Window Control Virtual Screens and Sub-Screens it creates for each of the Terminal Screens. The purpose of the Console Window Control Virtual Screens is to allow the user to view output from the Display Manager processing for Console Window control and enter input to the Display Manager processing for Console Window control. The important point is that the Display Manager separately processes Console Window control input and output for each Console Window.

Figure 8:
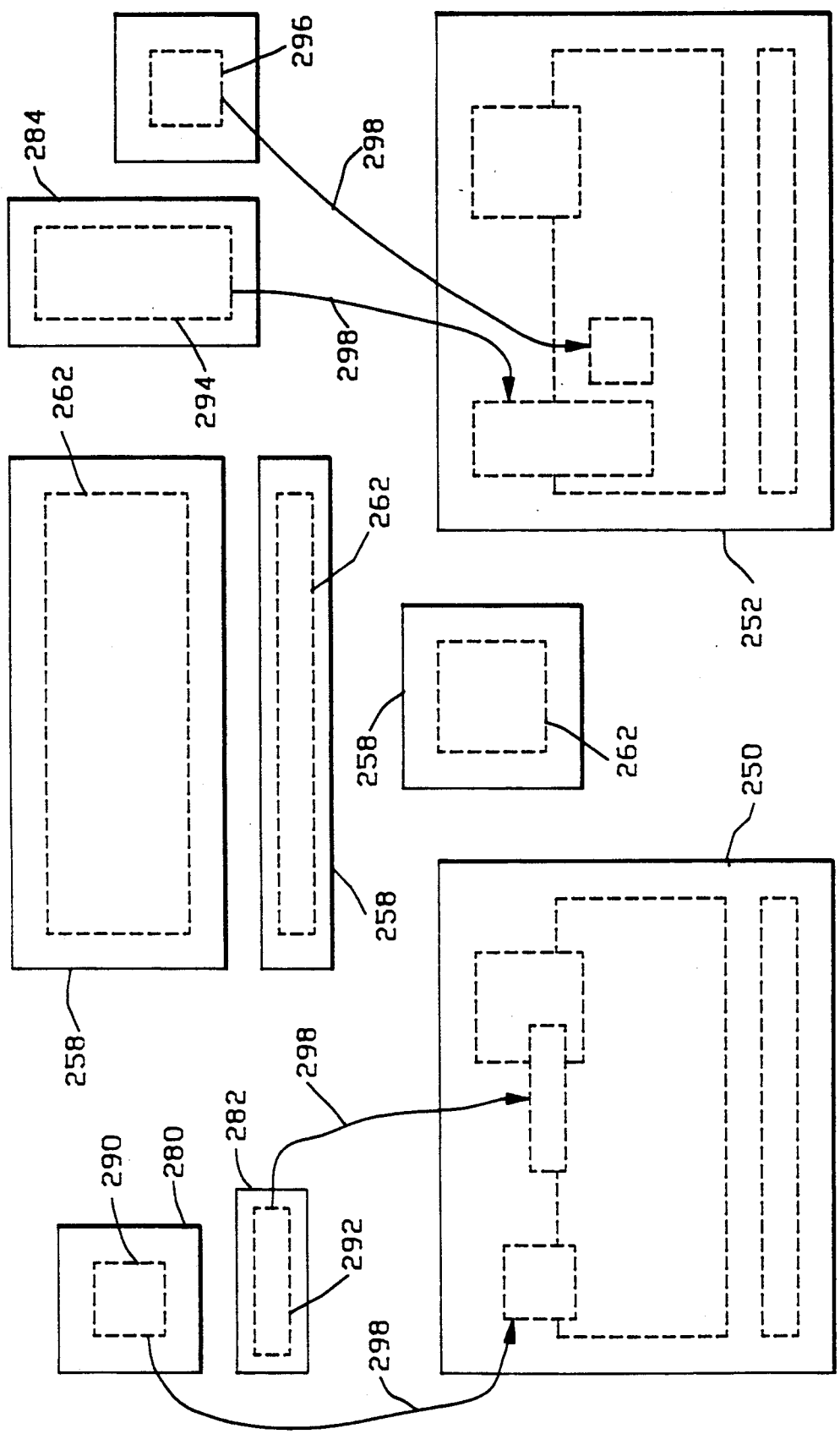
FIG. 8 shows the relationship between Terminal Screens, Virtual Screens, Sub-Screens, and the Console Window Control Virtual Screens and Sub-Screens.

FIG. 8 shows the relationship between Terminal Screens, Virtual Screens, Sub-Screens, and the Console Window Control Virtual Screens and Sub-Screens. FIG. 8 is the same basic example as shown in FIG. 7. The difference is that a separate set of Console Window Control Virtual Screens, shown as 280, 282, 284, and 286, is maintained for each of the Terminal Screens 250 and 252. Console Window Control Virtual Screens 280 and 282 are mapped to Terminal Screen 250, and Console Window Control Virtual Screens 284 and 286, are mapped to Terminal Screen 252. The Virtual Screens 280, 282, 284, and 286 are merely illustrative of a graphical user interface used by the Display Manager. Those skilled in the art will recognize that alternate user interfaces exist which a Display Manager type program could us to display its control output.

Each of the Console Window Control Virtual Screens 280, 282, 284, and 286 contain data the Display Manager uses to communicate with the operator. The Console Window Control Sub-Screens 290, 292, 294, and 296 for a particular Console Window 170 are mapped to a predetermined position for a Terminal Screen. The mapping is indicated by lines 298.

Figure 9:
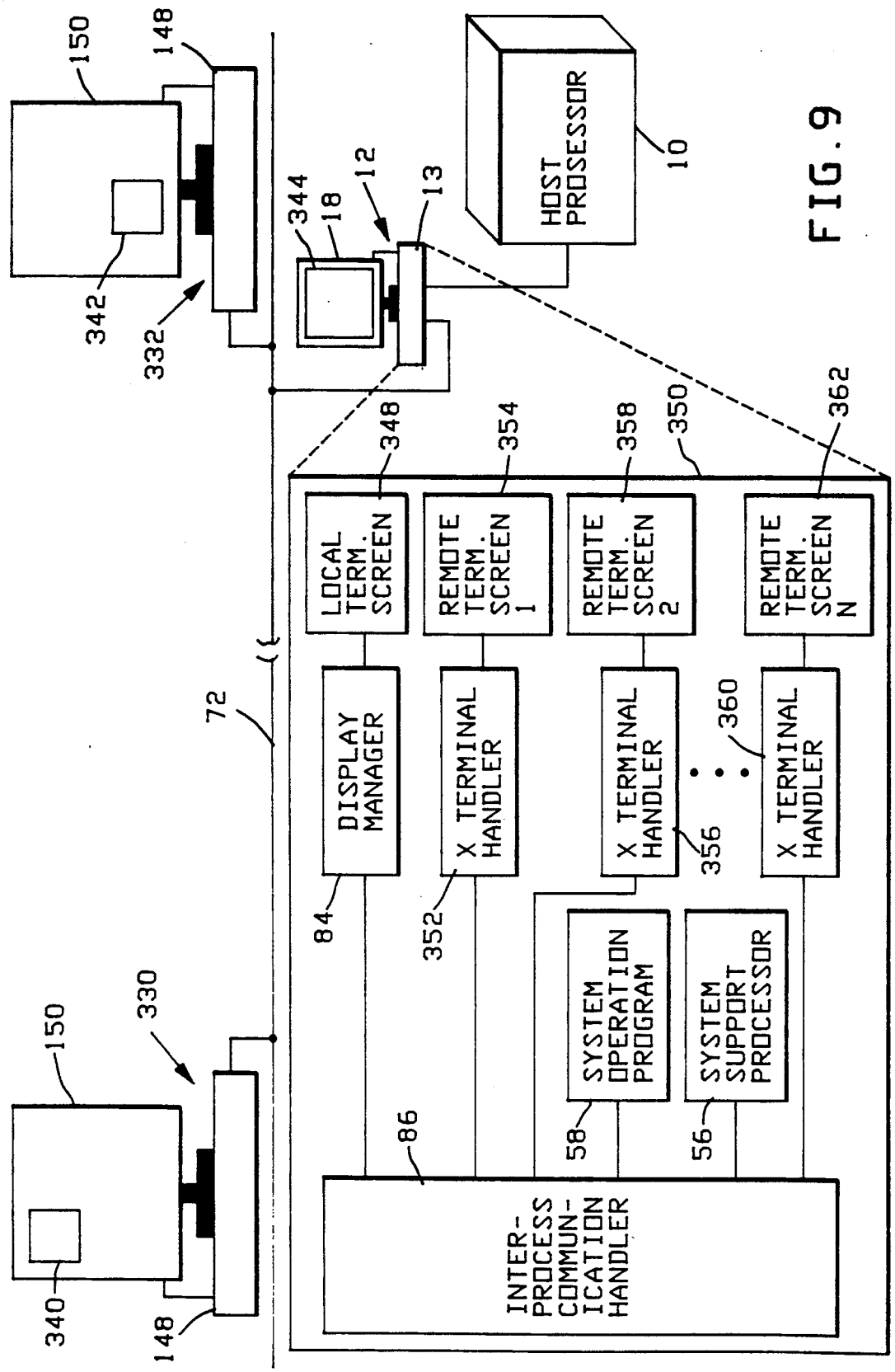
FIG. 9 shows the relationship between the Terminal Screens managed by the Display Manager and the Video Display Terminals on which the Terminal Screens are displayed in Console Windows.

FIG. 9 shows the relationship between the Terminal Screens managed by the Display Manager and the Video Display Terminals on which the Terminal Screens are displayed in Console Windows. A Console 12 is coupled to a Host Processor 10 for providing operator control capabilities over the Host Processor. The Console has a Console Video Display Terminal 18 coupled to a Console Processing Unit 13. Additionally, the Console is coupled to the Communications Network 72.

Two Workstations, 330 and 332, are coupled to the Communications Network 72 for communicating with Console 12 and thereby controlling Host Processor 10. Although only two Workstations 330 and 332 are shown, it should be understood that more that more than two Workstations can be supported with the present invention. Each Workstation has a Workstation Video Display Terminal 150 coupled to a Workstation Processing Unit 148 where the Workstation Video Display Terminal 150 displays output from programs executing on the coupled Workstation Processing Unit 148.

Remote Console Windows 340 and 342 are driven by data supplied from the Terminal Screens maintained by the Display Manager 84. Block 344 is the Local Console Window of a Terminal Screen which is displayed on the Video Display Terminal 18 that is coupled to the Console Processing Unit 13. Each of the Remote Console Windows 340 and 342 and the Local Console Window 344 can have data generated by a single Console application program, or each may have data generated by a different Console application program.

Block 350 is a subset of the software executing on the Console Processing Unit 13. A System Operation Program 58 and System Support Processor 56 represent two application programs on the Console 12. The two application programs communicate with the Display Manager 84 through an Interprocess Communication Handler 86.

The Display Manager 84 manages operator input and output for each of the Remote Console Window 340 and 342, and Local Console Window 344. The Display Manager directly processes input and output to the Local Console Window 344 and maintains a Local Terminal Screen 348 data structure whose contents drives the Local Console Window 344. When the Display Manager 84 receives a request to open a Remote Console Window 340, an X Terminal Handler 352 is started to handle input and output to the Remote Console Window 340. The X Terminal Handler 352 creates a Remote Terminal Screen data structure 354 whose contents are displayed in Remote Console Window 340. Likewise, when the Display Manager 84 receives a request to open a Remote Console Window 342, an X Terminal Handler 356 is started to handle input and output to the Remote Console Window 342, and the X Terminal Handler 356 creates a Remote Terminal Screen data structure 358 whose contents are displayed in Remote Console Window 342. X Terminal Handler 360 is shown to illustrate that an arbitrary number of Remote Console Windows could be driven from the Console 12.

In the prior art Console, the Display Manager maintained a Terminal Screen data structure for the Console Video Display Terminal and a Terminal Screen data structure for the Remote Terminal described earlier. The format of the data in each of the Terminal Screens was dependent on the hardware and software characteristics of the particular Video Display Terminal.

In the preferred embodiment, a Terminal Screen is created for each Video Display Terminal on which there is a display screen exposed, and each Terminal Screen is independent of the hardware and software Terminal. The data for a Terminal Screen is composed of character and color data from the Virtual Screens and Sub-Screens which an application program is currently using.

Figure 10:
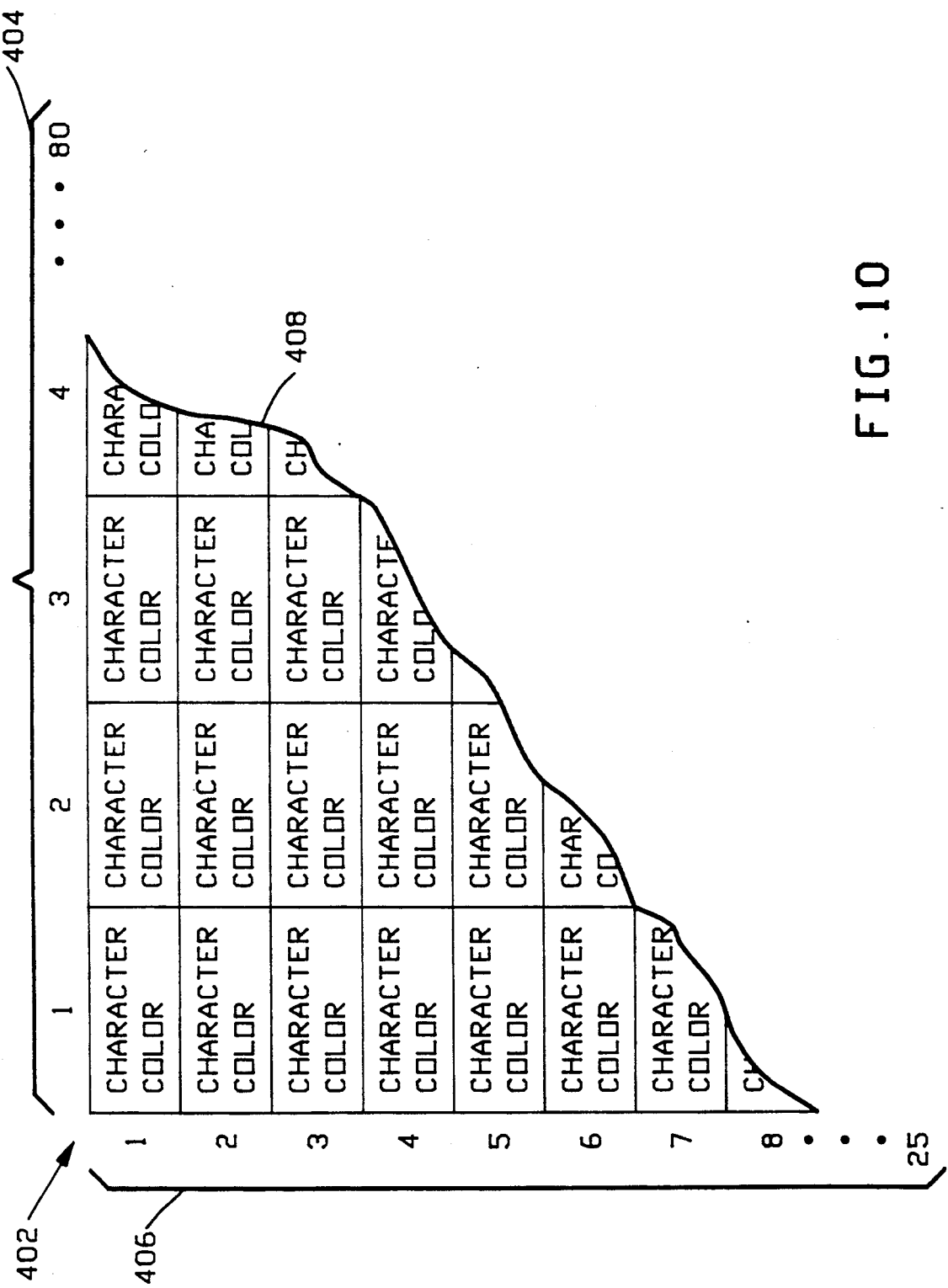
FIG. 10 shows the data structure for a Terminal Screen which hold the current state of a display screen for an application program.

FIG. 10 shows the data structure for a Terminal Screen which holds the current state of a display screen for an application program. The Terminal Screen 402 is simply a matrix having 80 columns 404 and 25 rows 406. Each Element 408 in the matrix corresponds to a character position on the Console Video Display Terminal 18, and consists of the ASCII character occupying the particular screen position and a color attribute signifying the color characteristic for the particular Video Display Terminal character position. When an application program makes a change to one of its Virtual Screens 258 (Shown in FIG. 7), the Display Manager 84 responds by updating the appropriate Terminal Screens.

Figure 11:
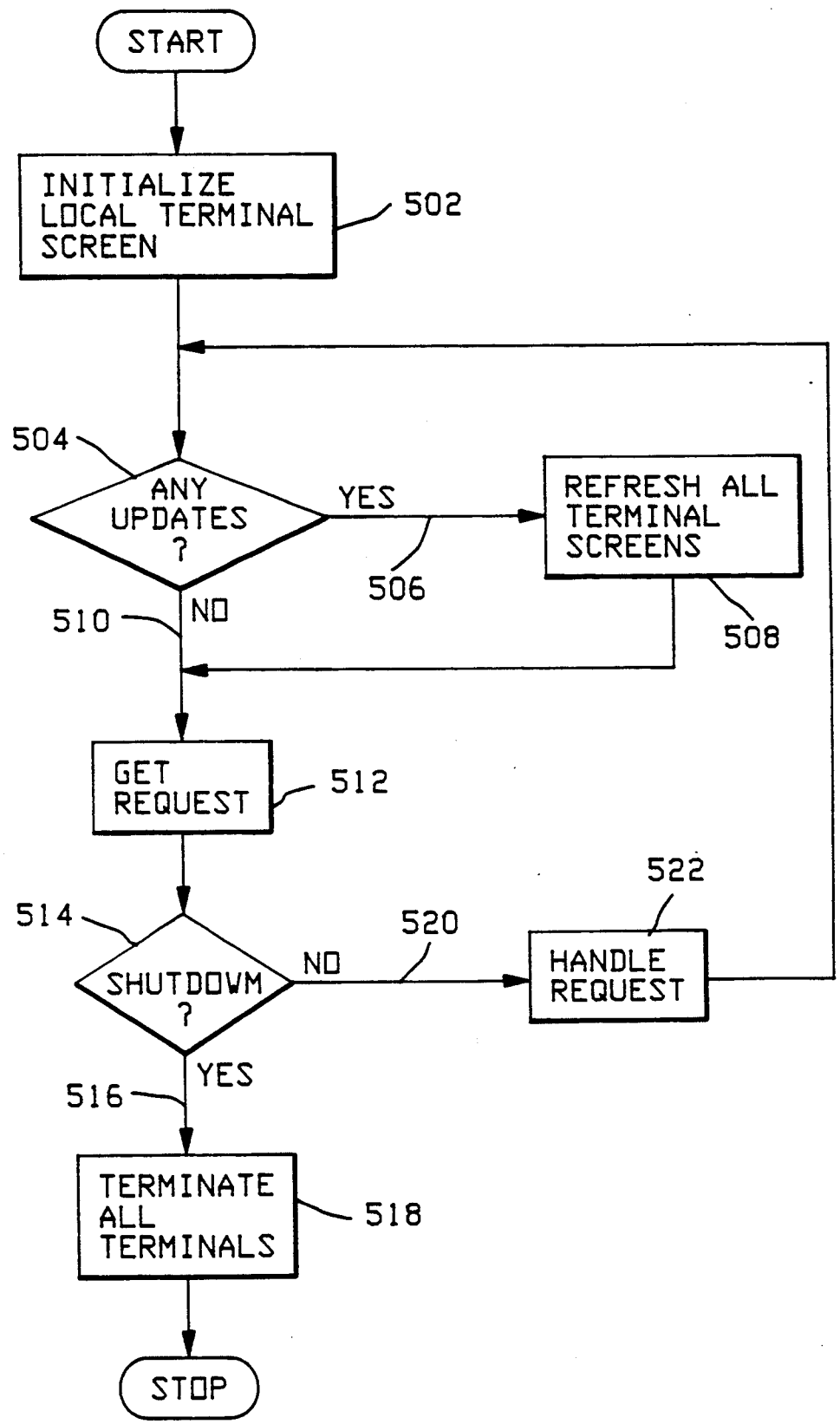
FIG. 11 shows the top level flow chart for the Display Manager.

FIG. 11 shows the top level flow chart for the Display Manager. As described above, the Display Manager 84 provides display services for the application programs running on the console and keeps the Terminal Screens synchronized.

The main processing loop of the Display Manager continually processes requests until it receives a request to halt processing. Beginning at operation 502 the Display Manager initializes the Local Terminal Screen, namely the Terminal Screen which is associated with the Console Video Display Terminal 18 coupled to the Console Processing Unit 13. The initial state of the Local Terminal Screen is all blank characters.

Following initialization, operation 504 queries whether there have been any Terminal Screen updates. If there have been any updates to any of the Terminal Screen data structures, control path 506 leads to operation 508 where Refresh All Terminal Screens processing is invoked. If no Terminal Screen updates were detected by test 504, control path 510 leads to operation 512.

Operation 512 retrieves a request from its a Display Manager request queue. Once a request has been retrieved, the Display Manager proceeds in interpreting the request in order to determine the appropriate action to take.

Test 514 tests whether the Display Manager has received a Shutdown request. If the test is affirmative, control path 516 leads to operation 518 where terminates all X Terminal Handlers and stops. If test 514 is negative, control path 520 leads to operation 522 where processing to Handle Requests is invoked.

Figure 12:
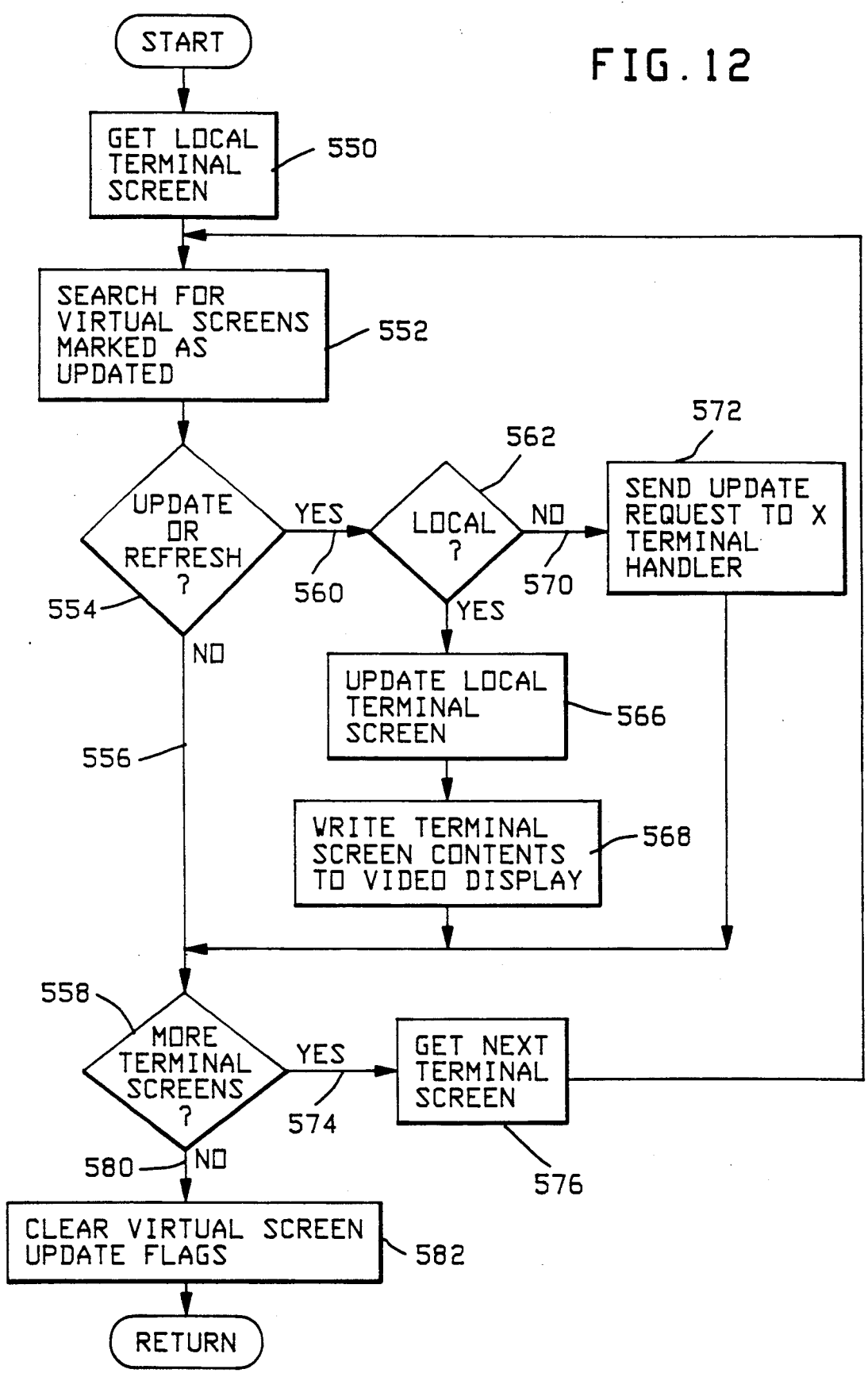
FIG. 12 shows the flowchart for the Refresh all Terminal Screens processing that updates all the Terminal Screens with changes to any Virtual Screens.

FIG. 12 shows the flowchart for the Refresh all Terminal Screens processing that updates all the Terminal Screens with changes to any Virtual Screens. At operation 550 a pointer to the Local Terminal Screen is retrieved from the list of Terminal Screens.

After the Local Terminal Screen is obtained, operation 552 searches the Virtual Screens, whose information comprises the Terminal Screen, for those which have been marked as updated. Test 554 checks whether any of the Virtual Screens have been marked as updated or the Terminal Screen has been marked as needing to be refreshed. If test 554 is negative, control path 556 leads to test 558. If the test 554 is affirmative, control path 560 leads to test 562 which determines whether it is the Terminal Screen for the Local Console Window which is being processed. If test 62 is affirmative, control path 564 leads to operation 566. Operation 566 updates the Terminal Screen with information from the Virtual Screens, and then operation 568 writes the contents of the Terminal Screen data structure to the Console Video Display Terminal 18. Processing then proceeds to test 558.

If test 562 determines that the Terminal Screen data structure retrieved is associated with a Remote Console Window 340, control path 570 leads to operation 572 sending a request to X Terminal Handler 352 to update the Terminal Screen 354 with information specified in the request. Processing then continues with test 558.

Test 558 checks whether there are any more Terminal Screens to process. If there are more, control path 574 leads to operation 576 retrieving the next Terminal Screen, and control is returned to operation 552 to search for Virtual Screens marked as updated. If test 558 determines that there are no more Terminal Screens to process, control path 580 leads operation 582 clearing the Virtual Screen Updated flags. Processing control is then returned to the main Display Manager processing.

Figure 13:
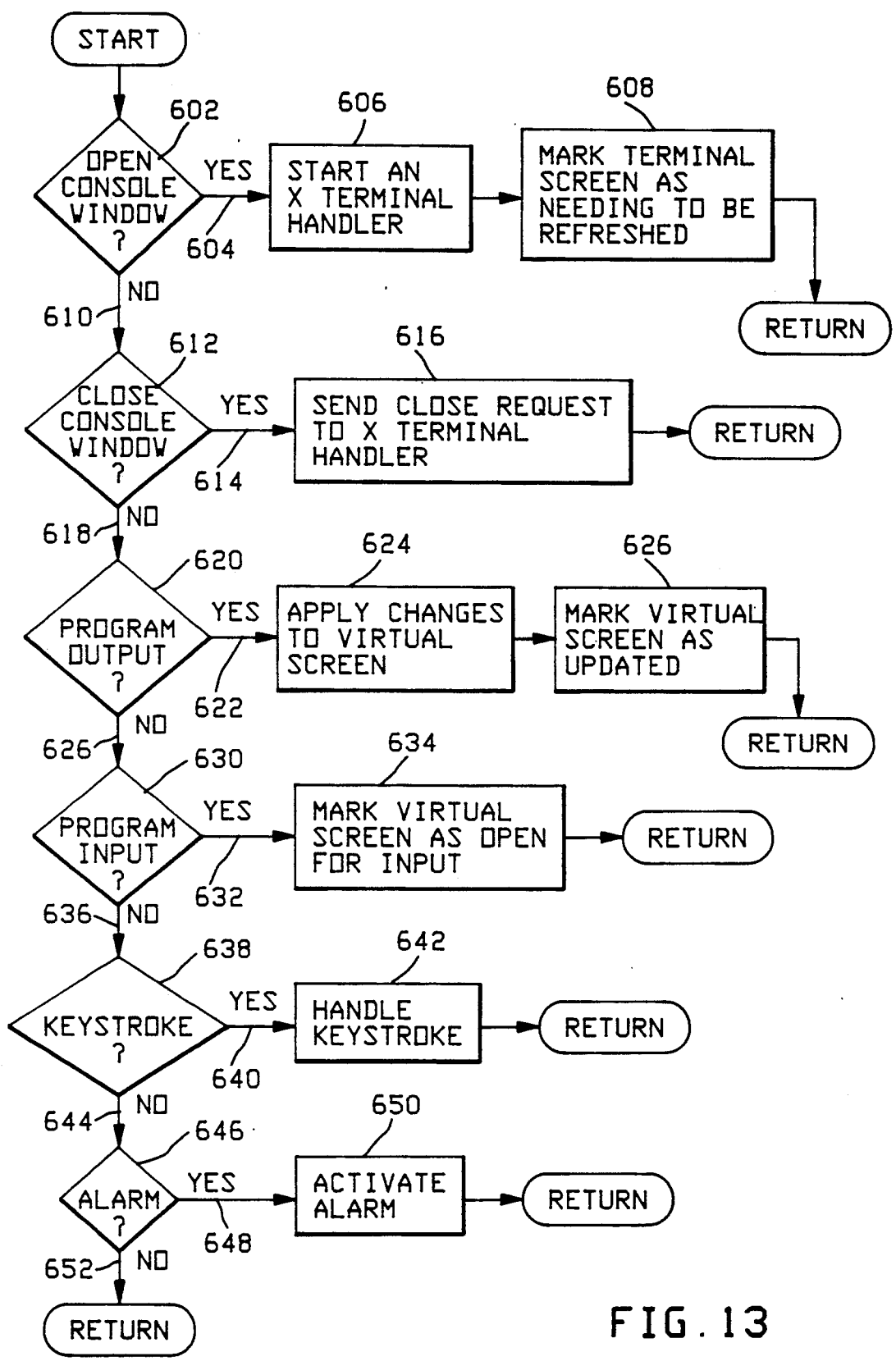
FIG. 13 shows the flowchart for the processing to Handle Requests retrieved by the Display Manager.

FIG. 13 shows the flowchart for the processing to Handle Requests retrieved by the Display Manager. Test 602 checks for an open Console Window request. If the request is to open a Console Window, control path 604 leads to operation 606 where an X Terminal Handler 352 is started. Operation 608 marks the Terminal Screen as needing to be refreshed so that Refresh Terminal Screens processing (See FIG. 12) updates the appropriate Console Window. Processing then returns to the Main Program of FIG. 11.

If test 602 is negative, control path 610 leads to test 612 where the Display Manager checks for a close Console Window request. If the test is affirmative, control path 614 leads to operation 616 sending a request to the X Terminal Handler 352 to close the Remote Console Window 340. Processing then returns to the Main Program of FIG. 11.

If the request is not a close Console Window request, control path 618 leads to test 620 which checks whether the request is to display program output. Program output comes from one of the Console application programs (System Operation Program or System Support Processor). If the request is for program output, control path 622 leads to operation 624 which applies the changes to the Virtual Screen. Operation 626 marks the Virtual Screen as updated so that Refresh Terminal Screens processing (See FIG. 12) knows to update the appropriate Terminal Screens. Processing then returns to the Main Program.

On failing test 620, control path 628 leads to test 630 which checks whether one of the Console application programs (System Operation Program or System Support Processor) is requesting that a Virtual Screen be made available for input. If so, control path 632 leads to operation 634 marking the input Virtual Screen as open for input and then control is returned to the Main Program.

If a Console application program is not requesting input, control path 636 leads to test 638 which checks for a keystroke. A keystroke is a character sent to the Display Manager from either a Keyboard 16 Console Processing Unit 13 or a Keyboard 152 coupled to a Workstation Processing Unit 148 displaying a Remote Console Window 340. If the request is a keystroke, control path 640 leads to invocation of the Handle Keystroke processing at operation 642. Processing is then returned to the Main Program.

If test 638 fails, control path 644 leads to test 646 which checks whether or not the request is an alarm. If so, control path 648 leads to operation 650 activating an alarm. After an alarm is activated, processing continues in the Main Program. If test 646 fails, control path 652 leads to control being returned to the Main Program.

Figure 14A:
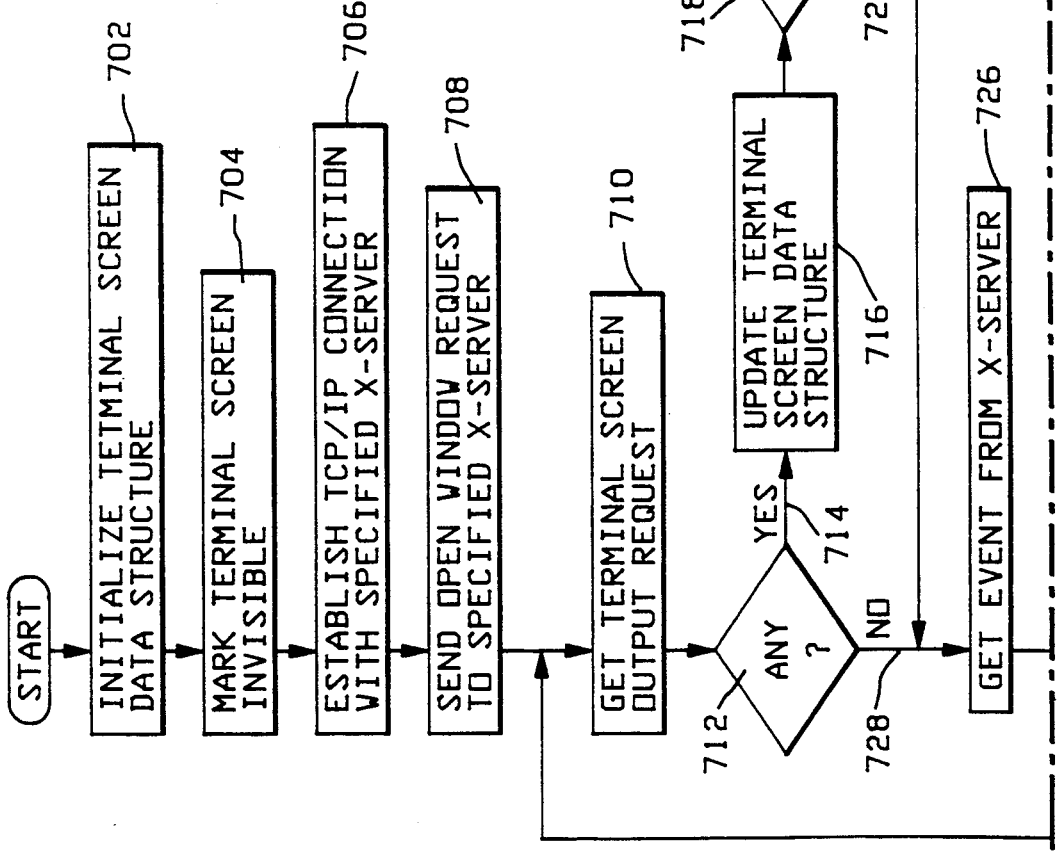
FIGS. 14A-14B are the flow chart of the X Terminal Handler processing for handling input and output from Remote Console Windows.
Figure 14B:
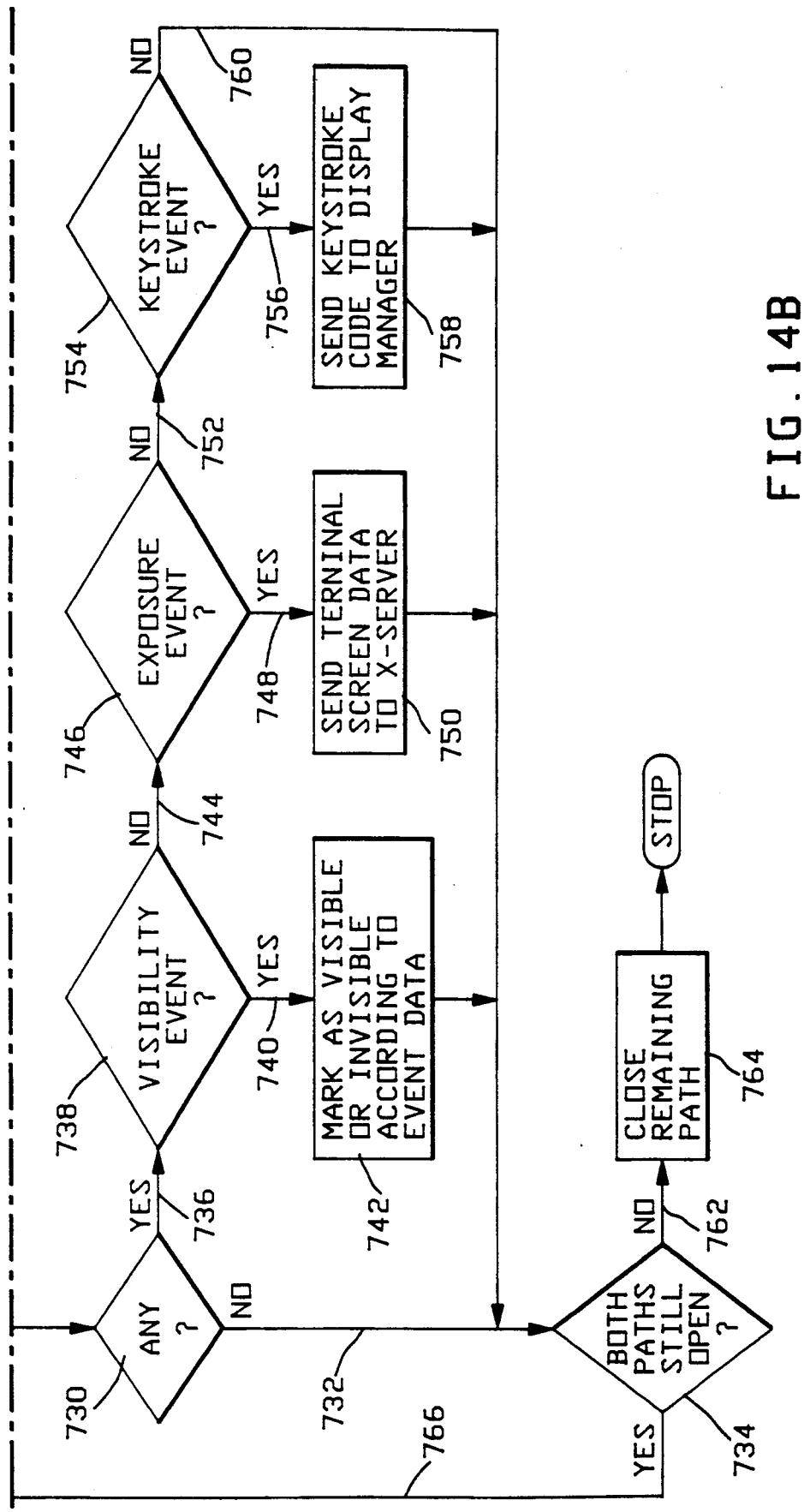

FIG. 14 is the flow chart of the X Terminal Handler 352 processing for handling input and output from Remote Console Windows 340. Operation 702 begins with initializing a Terminal Screen data structure.

Operation 704 marks the Terminal Screen as invisible. When a Terminal Screen is marked as invisible, it means that the associated Remote Console Window 340 is not visible to a user at the Workstation 330 An example of where the Remote Console Window would not be visible to a user at the Workstation would be where the Remote Console Window is made an icon through the Workstation graphical user interface.

Operation 706 establishes a TCP/IP software connection with a specified X-Server 180. Once the software connection is established, operation 708 sends an open window request to the specified X-Server 180 along with the window identifier sent from the Workstation software. The window created by the X-Server is then used by the X Terminal Handler 352 for a Remote Console Window 340.

Once a Remote Console Window 340 has been opened, the X Terminal Handler 352 begins a control loop of processing output requests from the Display Manager 84 and event requests from the X-Server 180 until either the Display Manager or the X-Server closes its communications path with the X Terminal Handler. Operation 710 retrieves a Terminal Screen output request sent by the Display Manager to the X Terminal Handler through the Console Interprocess Communication Handler 86.

Test 712 checks whether operation 710 was successful in retrieving an output request. If there is an output request to process control path 714 leads to operation 716 updating the Terminal Screen 354 data structure with the requested output. After updating the Terminal Screen, test 718 checks whether the Terminal Screen is marked as visible. If the Terminal Screen is marked as visible, control path 720 leads to operation 722 sending Remote Console Window 340 update requests to the X-Server. If test 718 fails control path 724 leads to operation 726. If test 712 finds that operation 710 was unsuccessful in retrieving an output request, control path 728 leads to operation 726.

Operation 726 retrieves an event sent from the X-Server 180. Test 730 then checks whether operation 726 found an event. If test 730 find that operation 726 was unsuccessful in retrieving an event, control path 732 leads to test 734. If test 730 is affirmative, control path 736 leads to test 738.

Test 738 checks whether the event sent from the X-Server is a visibility event. If so, control path 740 leads to operation 742 where the visibility event is interpreted and the Terminal Screen is marked as either visible or invisible as dictated by the event information. After operation 742, processing continues with test 734. If test 738 fails, control path 744 leads to test 746.

Test 746 determines whether the event received from the X-Server is an exposure event. The X-Server will send an exposure event to the X Terminal Handler when there has been a change in the arrangement of Windows 170 such that none, some or all of the Remote Console Window 340 is exposed on the Workstation 330 Video Display Terminal 150. If test 746 detects an exposure event, control path 748 leads to operation 750 updating the Remote Console Window as necessary. After operation 750, processing continues with test 734. If test 746 fails, control path 752 leads to test 754.

Test 754 checks whether the event sent from the X-Server is a keystroke event. If test 754 is affirmative, control path 756 leads to operation 758 sending a keystroke request to the Display Manager through the Console Interprocess Communication Handler 86. Attached to the keystroke request is the identifier for the Remote Console Window at which the keystroke was entered. Processing continues at test 734. If test 754 fails control path continues processing at test 734.

Test 734 checks whether both of the communication paths (with the Console Interprocess Communication Handler 86 and the X-Server 180) are still available. If either has become unavailable, control path 762 leads to operation 764 which closes the remaining communication path and stops processing. If test 734 finds both communication paths still available, control path 766 returns processing to operation 710.

Figure 15:
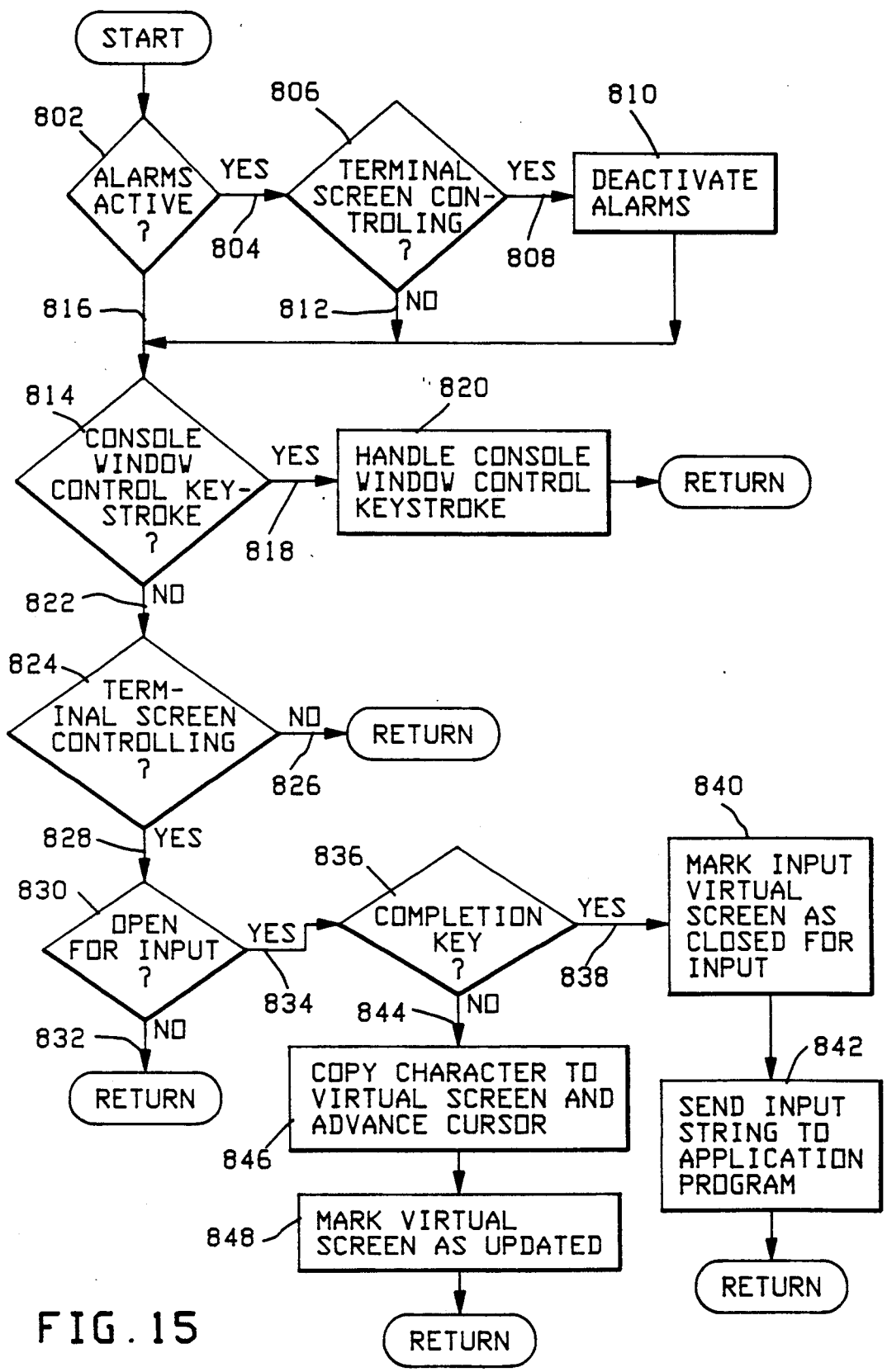
FIG. 15 is the flow chart of the Handle Keystroke processing for handling keystroke requests.

FIG. 15 is the flow chart of the Handle Keystroke processing for handling keystroke requests. Test 802 checks whether any alarms are active by checking an alarm active flag. If there are alarms active, control path 804 leads to test 806 which checks whether the Terminal Screen associated with the Console Window where the keystroke was entered is marked as controlling. If test 806 finds the Terminal Screen marked as controlling, control path 808 leads to operation 810 which deactivates alarms. If test 806 fails, the keystroke is ignored for purposes of deactivating alarms, and control path 812 leads to test 814. If there are no alarms active, control path 816 leads test 814.

Test 814 checks whether the keystroke entered pertains to Console Window Control. If so, control path 818 leads to operation 820 which processes Console Window Control keystrokes. After operation 820 control is returned to Handle Request Processing (See FIG. 13). If test 814 fails, control path 822 leads to test 824.

Test 824 checks whether the Terminal Screen associated with the Console Window where the keystroke was entered is marked as controlling. If not, the keystroke is ignored and control path 826 returns to Handle Request processing (See FIG. 13). If the Terminal Screen is marked as controlling, control path 828 leads to test 830.

Test 830 checks whether the Virtual Screen associated with the entered character is open for input. If not, control path 832 shows control being returned to the Handle Request processing. If the Virtual Screen is open for input, control path 834 continues processing with test 836.

If the keystroke represents the completion of an entered command (in Console processing this is represented by the character associated with the <Enter> keystroke), test 836 is affirmative and control path 838 leads to operation 840. Operation 840 marks the Virtual Screen as closed for input, following which operation 842 sends the input string of characters to the Console application program. Control is then returned to Handle Request processing.

If test 836 fails, signifying that a character other than the completion key was entered, control path 844 leads to operation 846. Operation 846 copies the character associated with the keystroke to the Virtual Screen and advances the cursor position within the Virtual Screen. Operation 848 marks the Virtual Screen as updated so that the character entered and cursor advancement are reflected in the Terminal Screens. Following operation 848 control is returned to Handle Request processing.

Console Window control provides functionality for the operator to selectively view output and enter input to the application programs executing on the Console, as well as additional functionality beyond the scope of the present invention. Most of the functionality for Console Window control processing existed in the prior art Console and does not need to be described for the purpose of the present invention. However, the basic processing for Console Window control is shown to provide context for that which is new for Console Window control as it relates to the present invention.

The Console Window Control processing as it relates to the present invention coordinates input between the Local Console Window 344 and any Remote Console Windows 340 and 344. In particular, since the present invention involves Console control of multiple Host Processors from multiple Workstations, it is desirable to allow an operator to select a single Console Window from which Console input will be exclusive. The rationality for providing this feature lies in a scenario where a Console application program has its Virtual Screens displayed on multiple Terminal Screens. If there is an operator entering input at each of the devices on which the Terminal Screens are displayed, the input received by the Console application program will be the combination of both operator inputs. This would cause confusion, and in the worst case, disastrous consequences for the Host Processor. Therefore the capability to select a single Console Window from which Console input will be exclusive is desirable.

Figure 16A:
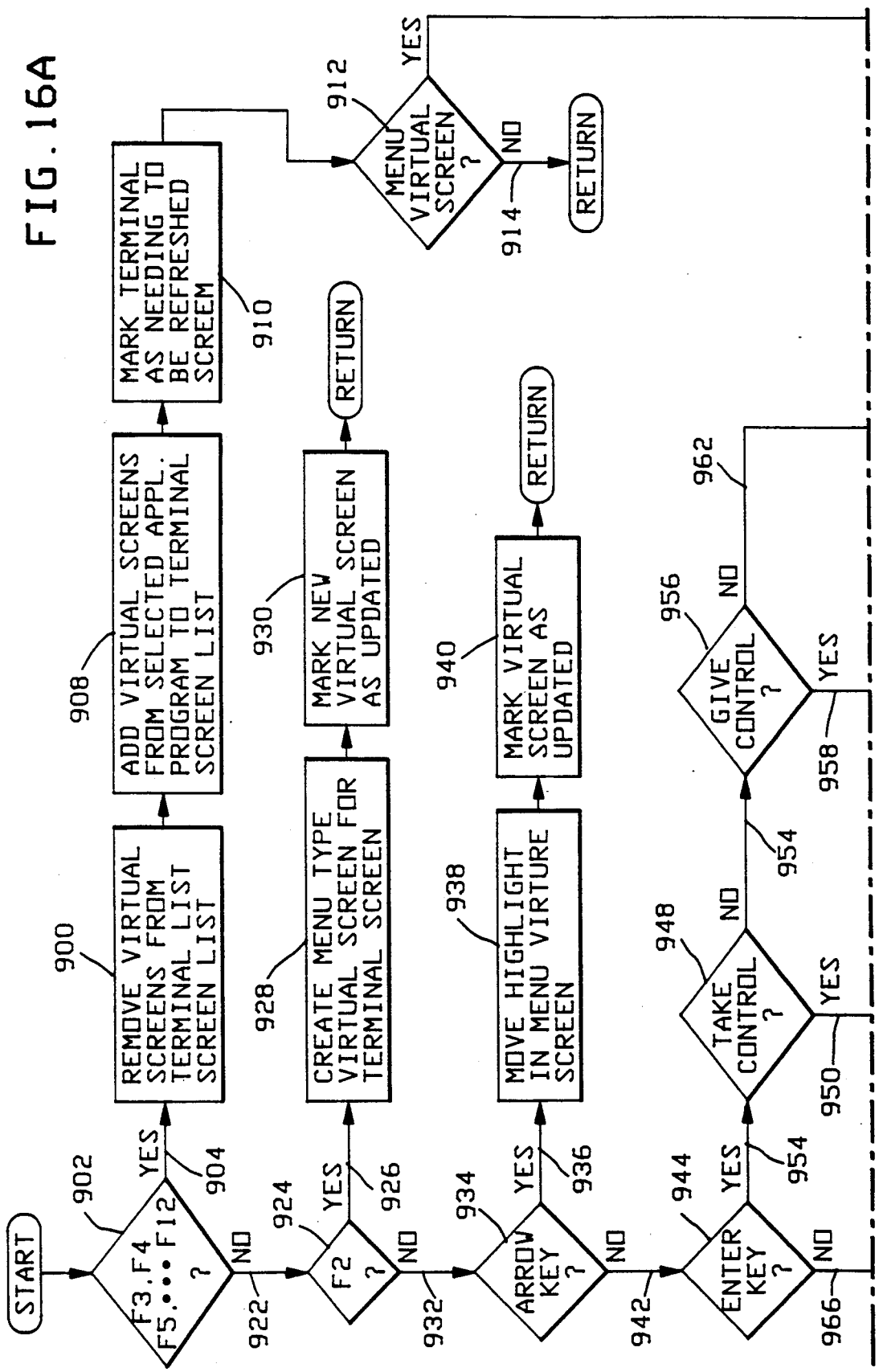
FIGS. 16A-16B show the flow chart for processing Console Window control keystrokes, and in particular processing for gaining exclusive input access to a Console.
Figure 16B:
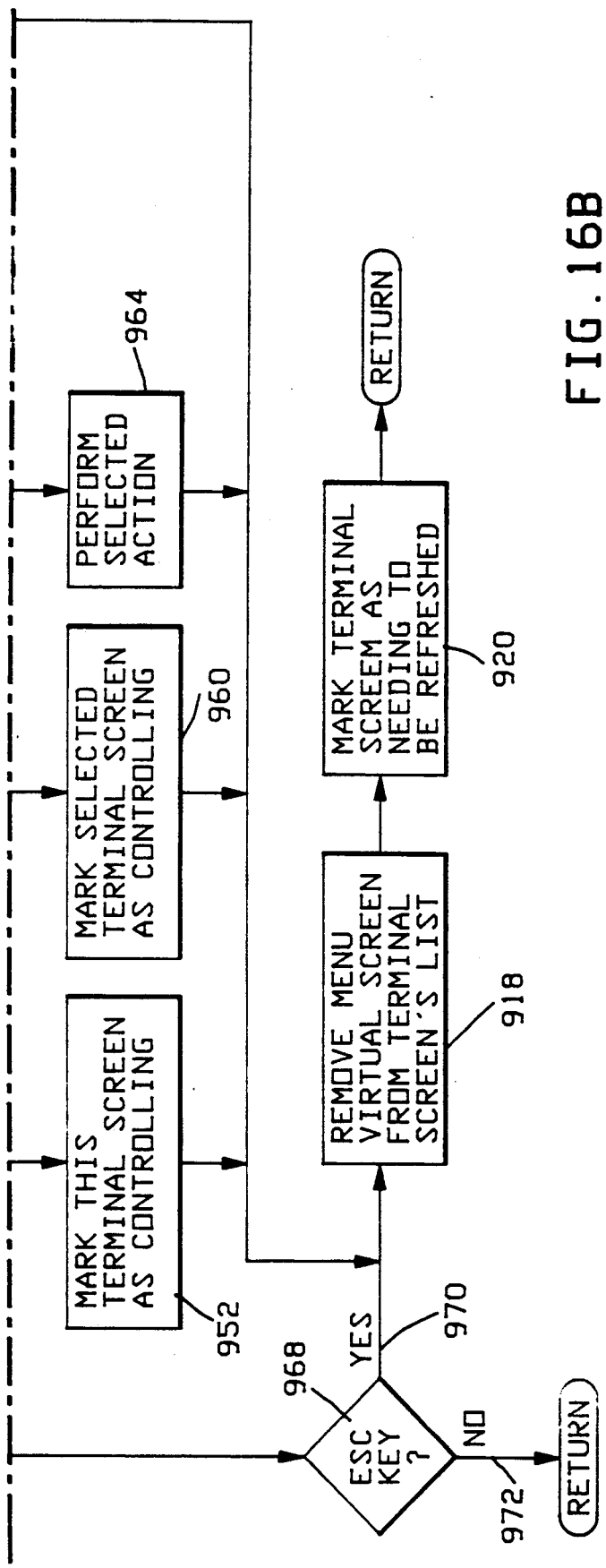
Figure 16:
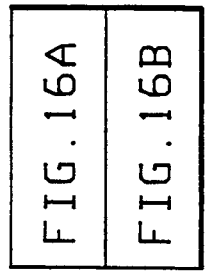

FIG. 16 shows the flow chart for processing Console Window control keystrokes, and in particular processing for gaining exclusive input access to a Console. Before discussing this flow chart it should be noted that all the processing shown in the FIG. 16 is present in the prior art Console with the exception of processing relating to marking a Terminal Screen as controlling. Processing begins with test 902 checking whether a function key was pressed. If a function key within the range F3 through F12 was pressed, a Console application program corresponding to the function key pressed is selected for program output and operator input. Control path 904 leads to operation 906 where the current list of Virtual Screens associated with the Terminal Screen are removed from the list for the Terminal Screen. At operation 908, the Virtual Screens for the selected application program are added to the Terminal Screen. Operation 910 marks the Terminal Screen as needing to be refreshed so that the Terminal Screen is subsequently updated with data from the Virtual Screens of the selected application program. Test 912 checks for a Menu type Virtual Screen on the Terminal Screen's list of Virtual Screens. If there is not a Menu type Virtual Screen in the list, control path 914 leads to control is returned to Handle Keystroke processing (Shown in FIG. 15). If there is a Menu type Virtual Screen, control path 916 leads to operation 918 where the Menu type Virtual Screen is removed from the Terminal Screen's list of Virtual Screens. Operation 920 again marks the Terminal Screen as needing to be refreshed with the current Virtual Screens. Thereafter, control is returned to Handle Keystroke (See FIG. 13) Processing.

If the function key pressed is not in the F3 through F12 range, control path 922 leads to test 924 which checks for the F2 function key. If the F2 key is pressed, processing proceeds to set up the Console Window Control menus. Control path 926 lead to operation 928 which creates a Menu type Virtual Screen to be added to the list of Virtual Screens for the Terminal Screen. The newly created Menu type Virtual Screen is marked as updated at operation 930, following which control is returned to Handle Keystroke processing.

If test 924 is negative, control path 932 leads to test 934 where a check is made for whether the key pressed is an ARROW key. Note, in most applications the UP, DOWN, RIGHT, and LEFT ARROW keys on a keyboard are used for cursor movement. If the key pressed is an arrow key, control path 936 leads to operation 938 where the appropriate area in a Menu Type Virtual Screen is highlighted to indicate that an ARROW key has been pressed. Operation 940 marks the Menu Type Virtual Screen as updated, and control is returned to Handle Keystroke processing.

Control path 942 leads to test 944 which determines whether the ENTER key has been pressed. When the ENTER key has been pressed, the indication is that a command has been completely entered and can be processed by the appropriate application program. In the case of Console Window Control Menus, when the ENTER key is pressed, the processing application program is the Display Manager. Upon detecting the ENTER key, control path 946 leads to test 948 which determines whether the requested command is to "Take Control". When the Take Control command is entered, control path 950 leads to operation 952 which marks the Terminal Screen as controlling. The effect of this operation is to exclude keyboard input made at devices on which other Terminal Screens are displayed. After marking the Terminal Screen, operation 918 removes the Terminal Screen Control Menu type Virtual Screen from the Terminal Screen's list of Virtual Screens, and operation 920 marks the Terminal Screen as needing to be refreshed. Control is then returned to the Handle Keystroke processing.

If the command entered does not specify to Take Control, control path 954 leads to test 956 which determines whether the command entered is "Give Control". The Give Control command provides the capability to relinquish control from a Terminal Screen which is currently marked as controlling to another Terminal Screen. If test 956 is affirmative, control path 958 proceeds to operation 960 where the selected Terminal Screen is marked as controlling. After marking the Terminal Screen, operation 918 removes the Terminal Screen Control Menu type Virtual Screen from the Terminal Screen's list of Virtual Screens, and operation 920 marks the Terminal Screen as needing to be refreshed. Control is then returned to the Handle Keystroke processing.

If test 956 is negative, control path 962 leads to operation 964 where more tests are made concerning the action to perform. This operation involves functionality beyond the scope of the present invention.

If test 944 does not find the ENTER key, control path 966 leads to test 968 which checks for the ESC key. If the ESC key is pressed, control path 970 leads to operation 918 which removes the Terminal Screen Control Menu type Virtual Screen from the Terminal Screen's list of Virtual Screens, and operation 920 marks the Terminal Screen as needing to be refreshed. Control is then returned to the Handle Keystroke processing. If test 968 does not find the ESC character, control path 972 returns to Handle Keystroke processing.

Figure 17:
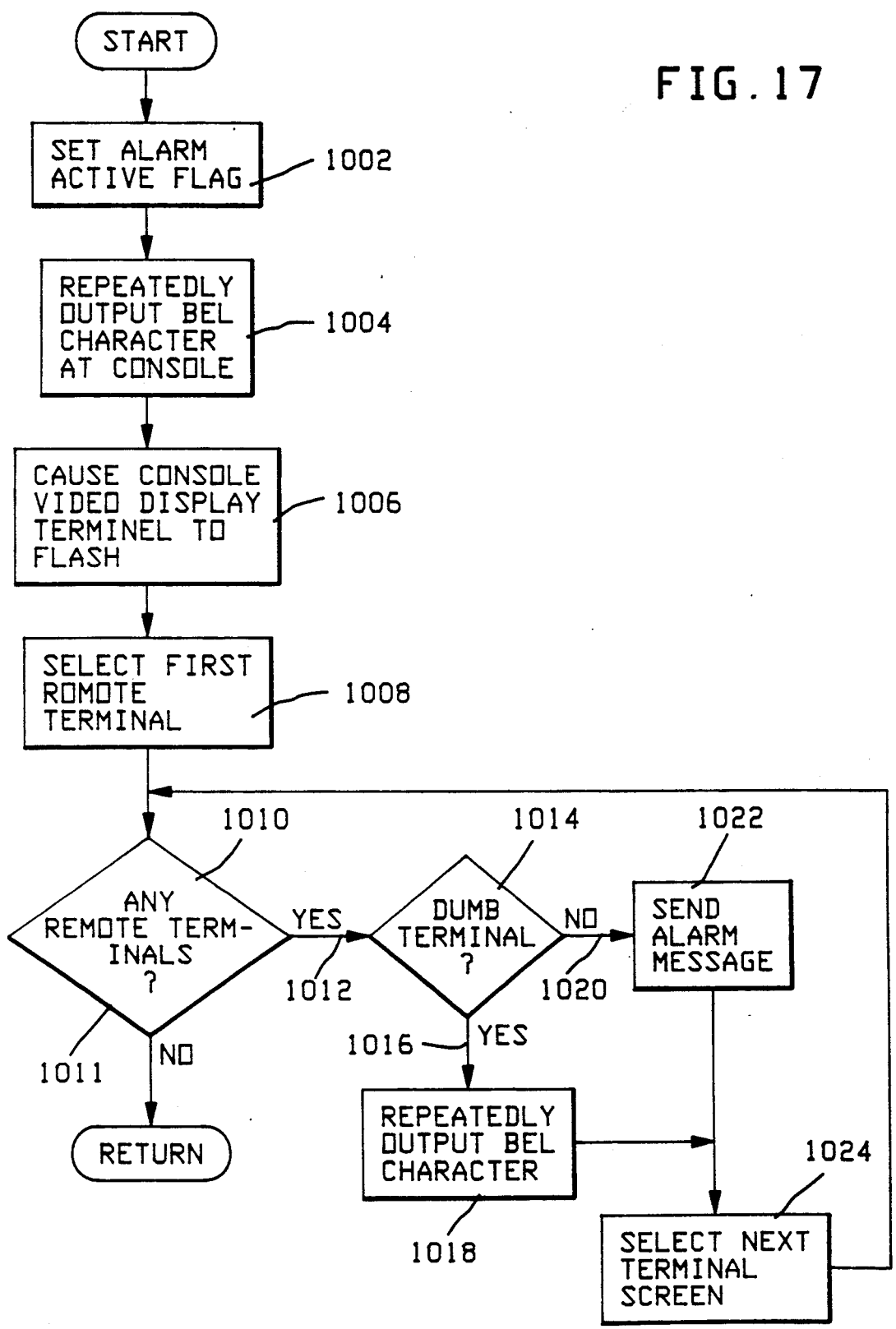
FIG. 17 is the flow chart for the Activate Alarm processing which takes place when an alarm at the Console is detected by a Console application program and has notified the Display Manager.

FIG. 17 is the flow chart for the Activate Alarm processing which takes place when an alarm at the Console is detected by a Console application program and has notified the Display Manager. Operation 1002 sets an Alarm Active flag to indicate that an alarm condition exists on the Console. Operation 1004 repeatedly outputs the ASCII BEL character at the Console for notifying an operator with an audible cue that attention is required on the Console. Next, operation 1006 causes the Console Video Display Terminal to flash repetitively for providing an operator with visual cue that attention is required on the Console.

Operation 1008 selects the first Terminal Screen for a Remote Console Window from the list of Terminal Screens. Test 1010 checks whether a Terminal Screen was found. If test 1010 fails, control path 1011 returns to Handle Request processing (See FIG. 13) If there is a Terminal Screen to process, control path 1012 leads to test 1014 which determines the type of Terminal Screen found. If the Terminal Screen corresponds to a Console Window on a Dumb Terminal, control path 1016 leads to operation 1018 repeatedly outputting the BEL character to the Dumb Terminal. If the Terminal Screen corresponds to that displayed on a Workstation, control path 1020 leads to operation 1022 where a message is sent to the Workstation 70 for notifying the Workstation software that an alarm condition exists on the Console. The message is sent from the Display Manager 84, through the Console Interprocess Communication Handler 86, to the Network Connection Manager 82 for routing to the appropriate Workstation 70. Following operations 1018 and 1022, operation 1024 selects the next Terminal Screen from the list of Terminal Screens and returns control to test 1010. When test 1010 finds that there are no more Terminal Screens to process, control path 1026 returns to Handle Request processing.

Figure 18:
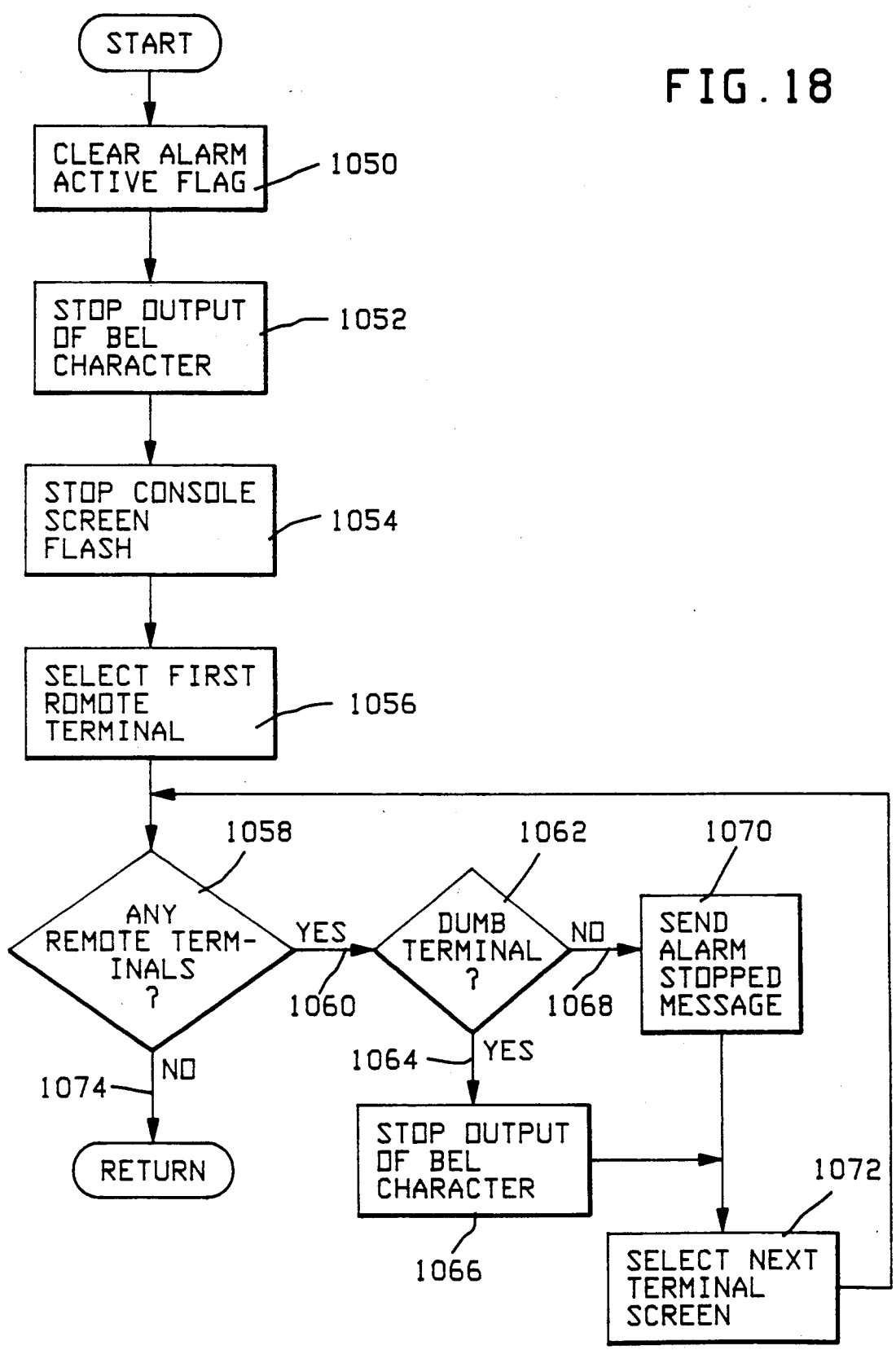
FIG. 18 shows the flow chart for the Deactivate Alarm processing for deactivating operator alert cues when an operator has responded to an alarm condition.

FIG. 18 shows the flow chart for the Deactivate Alarm processing for deactivating operator alert cues when an operator has responded to an alarm condition. Operation 1050 begins the process by clearing the Alarm Active flag. The audible cue from the BEL character is then stopped at operation 1052, following which the Console Video Display Terminal flash is stopped at operation 1054.

Operation 1056 selects the first Remote Terminal Screen data structure from the list of data structures. Test 1058 checks whether or not a Terminal Screen was found as a result of operation 1056. If a Terminal Screen was found, control path 1060 leads to test 1062 which determines the type of device on which the selected Terminal Screen is displayed. If the display device is a Dumb Terminal, control path 1064 leads to operation 1066 where output of the BEL character to the Dumb Terminal is stopped. If the display device is not a Dumb Terminal, control path 1068 leads to operation 1070 sending an alarm stopped message to the Workstation corresponding to the selected Terminal Screen. The message is sent from the Display Manager 84, through the Console Interprocess Communication Handler 86, to the Network Connection Manager 82 for routing to the appropriate Workstation 70. After completing operations 1066 and 1070, operation 1072 selects the next Terminal Screen from the list of Terminal Screens and control returns to test 1058. When test 1058 finds that there are no more Terminal Screens to process, control path 1074 returns to Handle Keystroke processing.

The remaining operational discussion deals with processing of software on the Workstation 70 for initiating an open Console Window request, closing a Console Window, and processing alarm events from the Console 12. The starting point for the discussion is the data model. As pointed out earlier, the data model contains the relationships between classes of data objects and attributes.

Figure 19:
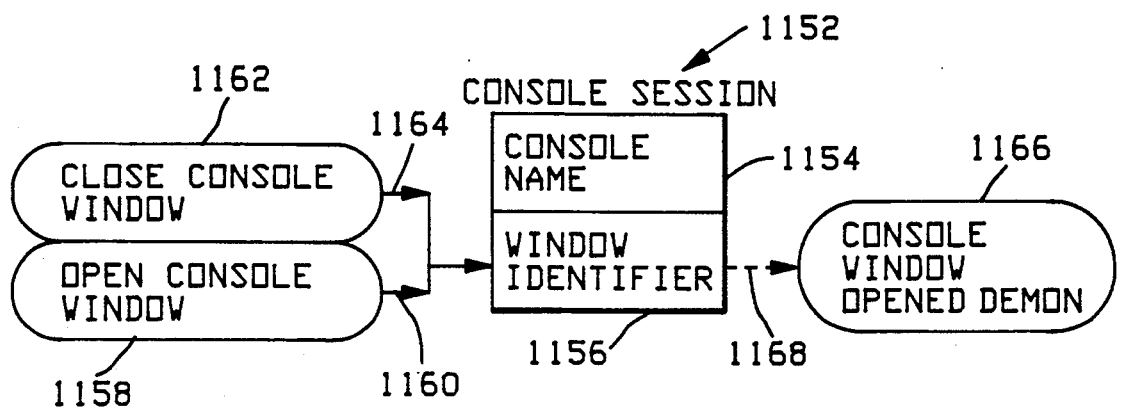
FIG. 19 shows the relationship between a CONSOLE SESSION data object, an Open Console Window Function, and a Console Window Opened Demon.

FIG. 19 shows the relationship between a CONSOLE SESSION data object, an Open Console Window Function, and a Console Window Opened Demon. The specification for the CONSOLE SESSION 1152 data object is defined in the data model. When the processing for the application program 190 is initiated, data objects conforming to the CONSOLE SESSION definition in the data model are created for each Console 12 that is defined for the application 190. The Consoles for which the application 190 creates CONSOLE SESSION data objects are defined by the user prior to initiation of application 190 processing.

The CONSOLE SESSION 1152 has two attributes: the CONSOLE NAME 1154, and the WINDOW IDENTIFIER 1156. When a CONSOLE SESSION 1152 object is created, the CONSOLE NAME attribute is assigned the name by which the particular Console 12 is addressed on the Communications Network 72. The WINDOW IDENTIFIER attribute is initially assigned a value of UNKNOWN.

Open Console Window 1158 is a function which is invoked by the Graphical Tool-kit 196. The Graphical Tool-kit 196, in combination with the Knowledge Engineering System 192, manages graphical data objects which a user can manipulate through a Keyboard 152 or a Mouse (Not shown in the figures). For each Console 12 that a user has predefined to be part of a configuration, a corresponding graphical data object is created. Upon user action on a Console graphical data object, the Graphical Tool-kit 196 invokes a predetermined function. The details for this processing are beyond the scope of the present invention and are also well known in the prior art. For the purpose of the present invention, an Open Console Window function 1158 is defined for invocation by the Graphical Tool-kit upon user manipulation of a Console graphical data object. The Open Console Window function 1158 asserts a value 1160 into the WINDOW IDENTIFIER 1156 attribute of the CONSOLE SESSION 1152 data object. Similarly, the Close Console Window 1162 function is invoked by the Graphical Tool-kit when the user manipulates a graphical data object indicating that the Console Window 342 is to be closed. The Close Console Window 1152 function asserts 1164 a value of UNKNOWN into the WINDOW IDENTIFIER 1156 attribute.

A Console Window Opened Demon 1166 monitors the WINDOW IDENTIFIER 1156 attribute and is fired 1168 when the WINDOW IDENTIFIER 1156 attribute is asserted 1160 a known value.

Figure 20:
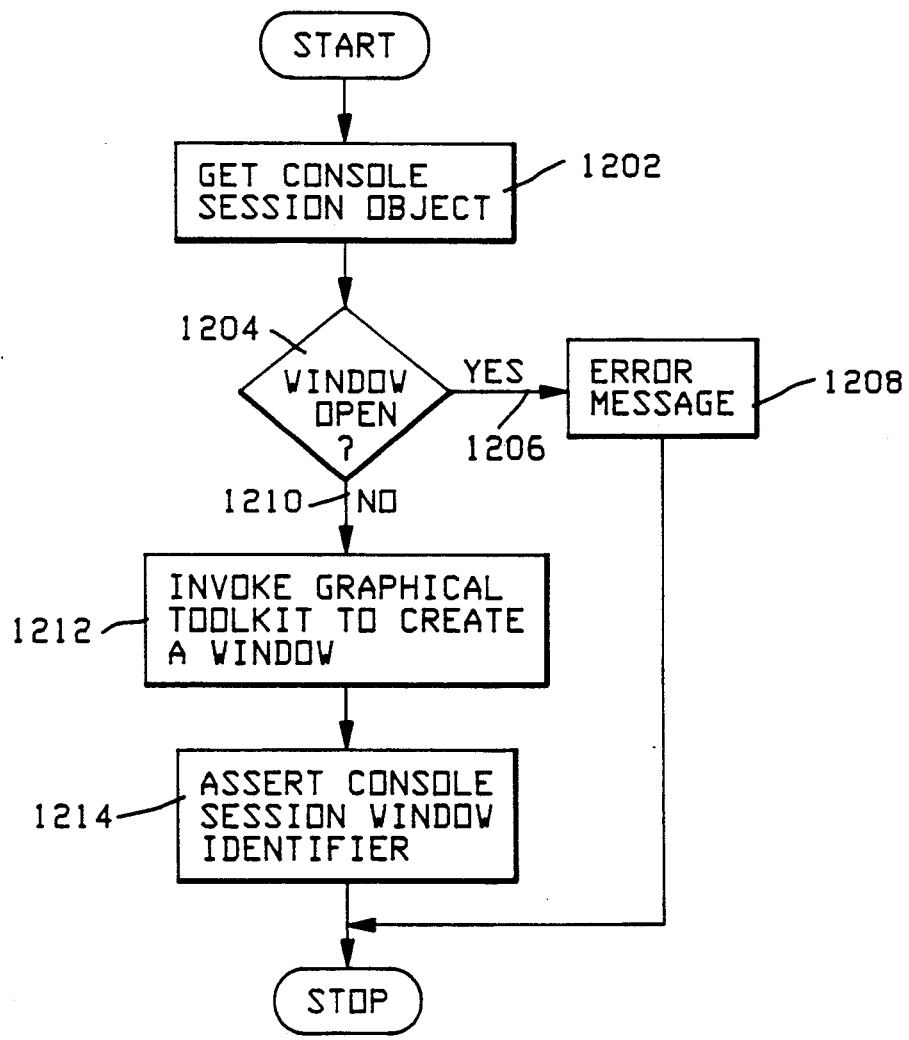
FIG. 20 is a flow chart for the Open Console Window function that is invoked by the Graphical Tool-kit when the Graphical Tool-kit detects that a user has manipulated a Console graphical data object and desires that a Console Window be opened.

FIG. 20 is a flow chart for the Open Console Window function 1158 that is invoked by the Graphical Tool-kit 96 when the Graphical Tool-kit detects that a user has manipulated a Console graphical data object and desires that a Console Window 340 be opened. Operation 1202 retrieves the CONSOLE SESSION data object whose CONSOLE NAME 1152 matches that of the Console graphical data object manipulated. After retrieving the CONSOLE SESSION data object, test 1204 checks whether the WINDOW IDENTIFIER 1156 attribute is UNKNOWN. If the WINDOW IDENTIFIER attribute already has a value, control path 1206 leads to operation 1208 invoking the Graphical Tool-kit to display an error message for the user. After displaying the error message, processing is complete.

If test 1204 finds that the WINDOW IDENTIFIER 1156 attribute is UNKNOWN, control path 1210 leads to operation 1212 which invokes the Graphical Tool-kit 196 for opening an empty Window 170. The Graphical Tool-kit invokes the X Window System to open a window and is returned a window identifier for the window. The Graphical Tool-kit returns the window identifier for the window opened and operation 1214 asserts 1160 the returned window identifier into the WINDOW IDENTIFIER 1156 attribute. After the assertion is complete, the Open Console Window function stops. FIG. 21 is a flow chart for the Console Window Opened Demon 1162 which is fired 1164 when a CONSOLE SESSION WINDOW IDENTIFIER 1156 attribute is asserted a known value. Guard 1250 monitors the WINDOW IDENTIFIER attribute. When the value of the attribute is asserted a known value, operation 1252 invokes the Request Console Window processing. When the Request Console Window processing is complete, the demon stops.

FIG. 22 is the flow chart for the Request Console Window processing that sends a message to the Console 12 to open a Console Window 340. Operation 1272 retrieves the Video Display Terminal 150 device identifier from the X Window System. After the device identifier is retrieved, operation 1274 obtains the WINDOW IDENTIFIER associated with the Console Window. Operation 1274 sends an open Console Window request containing the device identifier and window identifier to the Console 12 identified by the CONSOLE NAME 1154 attribute. The device identifier is used by the Console software to address the X-Server 180 associated with the Workstation 70. The WINDOW IDENTIFIER allows the Console to display the Terminal Screen in the window created by the Graphical Tool-kit. The request message is sent via the Console Message and Event Handler 200, the Interprocess Communication Handler 198, and the Console Connection Manager 184. The details for sending a message over the Communications Network 72 are beyond the scope of the present invention and will not be discussed further.

FIG. 23 is a flow chart for the Close Console Window function 1162 that is invoked by the Graphical Tool-kit 196 when the Graphical Tool-kit detects that a user has manipulated a graphical data object and desires that a Console Window 340 be closed. Operation 1302 retrieves the CONSOLE SESSION 1152 data object whose CONSOLE NAME 1154 attribute matches that of the name passed to the Close Console Window processing. After the CONSOLE SESSION data object is retrieved, operation 1304 invokes the Graphical Tool-kit 196 processing to close the Window 170 with window identifier that matches the WINDOW IDENTIFIER 1156 attribute in the CONSOLE SESSION 1152 data object. After the Window has been closed, operation 1306 asserts the WINDOW IDENTIFIER 1156 attribute in the CONSOLE SESSION 1152 data object to be UNKNOWN.

Processing of alarm events received from the Console will be explained by describing: 1) the data model objects involved in alarm processing; 2) the functions which assert values into data object attributes; and 3) the demons which react to assertion of attributes.

Figure 24:
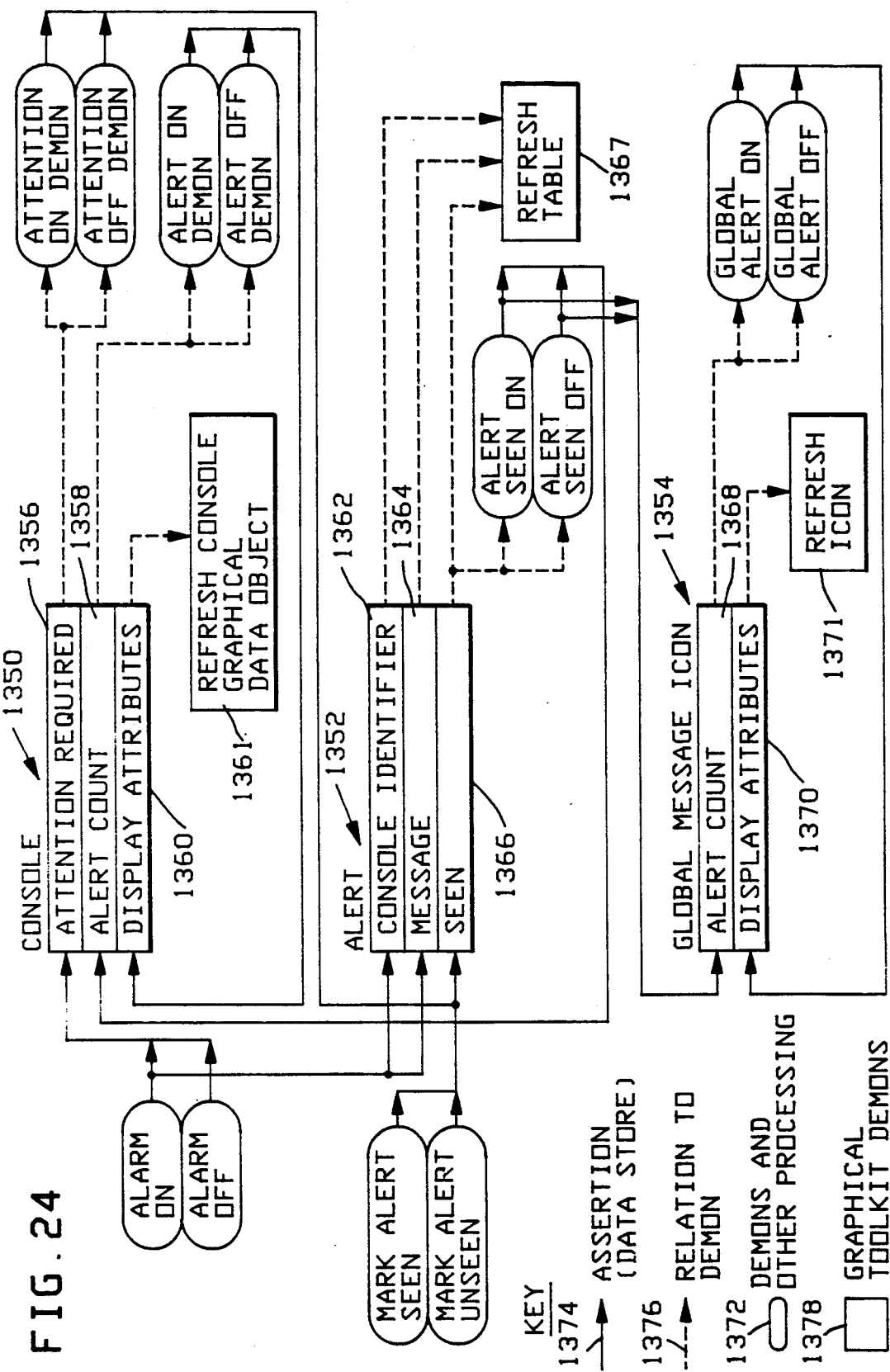
FIG. 24 illustrates the data model objects involved in alarm processing, the functions which assert values into data object attributes, and the demons which react to assertion of attributes.

FIG. 24 illustrates the data model objects involved in alarm processing, the functions which assert values into data object attributes, and the demons which react to assertion of attributes. The three data objects which are involved in alarm processing are the CONSOLE 1350 data object, the ALERT 1352 data object, and the GLOBAL MESSAGE ICON 1354 data object. A description of the data objects and their attributes follows.

CONSOLE 1350 data object has two attributes for alarm processing, the ATTENTION REQUIRED 1356 attribute, the ALERT COUNT 1358 attribute, and various DISPLAY ATTRIBUTES 1360. The ATTENTION REQUIRED 1356 attribute is asserted a value of True when an alarm message for a particular Console 12 is received at the Workstation 70. When an alarm off message is received the value is asserted to False.

The ALERT COUNT 1358 attribute holds a count of the number of alarm messages received from a particular Console which have not been seen by a user.

The DISPLAY ATTRIBUTES 1360 for a CONSOLE 1350 represent the collection of attributes associated with a Console graphical data object which represents a particular CONSOLE data object. For each CONSOLE data object a Console graphical data object is created by the Graphical Tool-kit. This set of attributes for the CONSOLE data object drives the display characteristics for the Console graphical data object maintained by the Graphical Tool-kit. An example display characteristic is the color of the Console graphical data object. The color is used to indicate when a Console 12 might require operator attention, with red indicating that the Console requires attention and green signifying normal operation. Block 1361 is the Graphical Tool-kit processing which is triggered a change in a CONSOLE data object's DISPLAY ATTRIBUTES. The Graphical Tool-kit processing involves updating the Console graphical object on the Workstation Video Display Terminal 150 with the proper DISPLAY ATTRIBUTES.

An ALERT 1352 data object has three attributes, the CONSOLE IDENTIFIER 1362, a MESSAGE 1364, and a SEEN attribute. The CONSOLE IDENTIFIER attribute 1362 holds the name of the CONSOLE 1350 data object with which the ALERT 1352 data object is associated; the MESSAGE 1364 attribute holds the text of an alarm message which is sent from a Console; and the SEEN 1366 attribute holds a flag for indicating whether the user is aware of the particular ALERT. The Graphical Tool-kit contains processing which can be invoked by a user to display an Alert Table with the values of the attributes of the existing ALERT data objects. The Alert Table entry corresponding to the SEEN attribute 1366 can be manipulated with a Mouse.

Block 1367 is the Graphical Tool-kit processing which is triggered by a change in an ALERT data object 1352. The processing consists of updating the Alert Table with the information from the attributes in the ALERT data object. The Graphical Tool-kit affects changes in the Alert Table displayed on the Workstation Video Display Terminal by calling the X Window System to update the window containing the Alert Table. The window identifier for the window containing the Alert Window is that obtained when the Graphical Tool-kit uses the X Window System to open a window.

A GLOBAL MESSAGE ICON 1354 data object has two attributes: an ALERT COUNT 1368 and DISPLAY ATTRIBUTES 1370. The ALERT COUNT 1368 attribute holds a count of the number of ALERT 1352 data objects whose SEEN 1366 attribute is FALSE. The DISPLAY ATTRIBUTES represents various attributes associated with the display characteristics of the GLOBAL MESSAGE ICON data object.

The GLOBAL MESSAGE ICON data object 1354 is used to track the status of all ALERT data objects 1352. Where there is an ALERT data object that has an SEEN attribute 1366 set to false, the GLOBAL MESSAGE ICON data object is used to indicate the display characteristics for the Global Alert graphical data object maintained by the Graphical Tool-kit 196. The Global Alert graphical data object permits the user to quickly ascertain whether any of the Consoles in the configuration has issued an issued an Alarm On message that has gone unnoticed by the operator. One of the DISPLAY ATTRIBUTES 1370 is the color of the Global Alert graphical data object.

Block 1371 is the Graphical Tool-kit processing that is triggered by a change in the DISPLAY ATTRIBUTES 1370 for the GLOBAL MESSAGE ICON data object 1354. The Graphical Tool-kit processing involves updating the Global Alert graphical object on the Workstation Video Display Terminal 150 with the proper DISPLAY ATTRIBUTES. In the preferred embodiment, the graphical object representing the Global Alert is an ordinary window. The Graphical Tool-kit affects changes in the Global Alert Window displayed on the Workstation Video Display Terminal by calling the X Window System to update the Global Alert Window with the appropriate colors. The window identifier for the Global Alert Window is that obtained when the Graphical Tool-kit uses the X Window System to open the window.

In addition to the data objects involved in alarm processing, FIG. 24 shows the demons and other processing affecting the data objects. The demons and other processing are illustrated by symbol 1372. Solid lines with an arrow head leading into an attribute signify the assertion of a value into an attribute. Symbol 1374 illustrates this line. Dashed lines with arrow heads, as illustrated by symbol 1376, represent the relationship between a demon and a particular attribute. Symbol 1378 is used to illustrate functions performed by the Graphical Tool-kit 196 upon modification of certain attributes. Each of the particular demons and other processing represented by symbol 1372 are discussed in more detail below.

Figure 25:
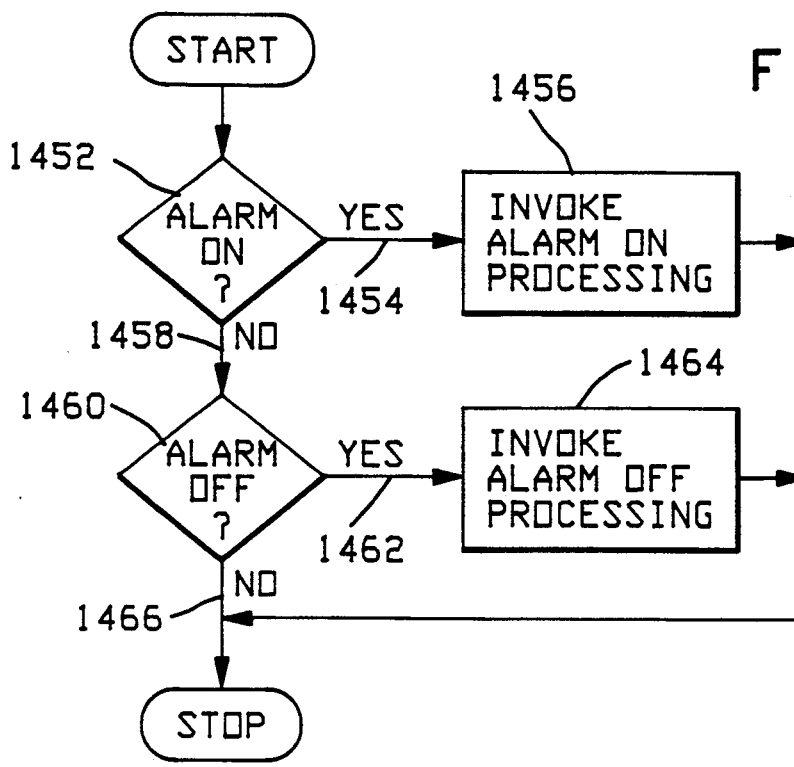
FIG. 25 is the processing of the Console Message and Event Handler which is activated upon receipt of a message from a Console.

FIG. 25 is the processing of the Console Message and Event Handler 200 which is activated upon receipt of a message from a Console 12. The processing shown is that relating to alarms from a Console. Test 1450 checks whether the message received indicates that a Console has detected an alarm condition and has sent an alarm on message. If test 1452 is affirmative, control path 1454 leads to operation 1456 where Alarm On Processing is invoked. Upon completion of Alarm On Processing, the Console Event Processing stops.

If test 1452 fails, control path 1458 leads to test 1460 which checks for an alarm off message. If the message indicates an alarm off event, control path 1462 leads to operation 1464 which invokes Alarm Off Processing. If test 1460 does not find an alarm off event, control path 1466 is taken and Console Event Processing stops.

Figure 26:
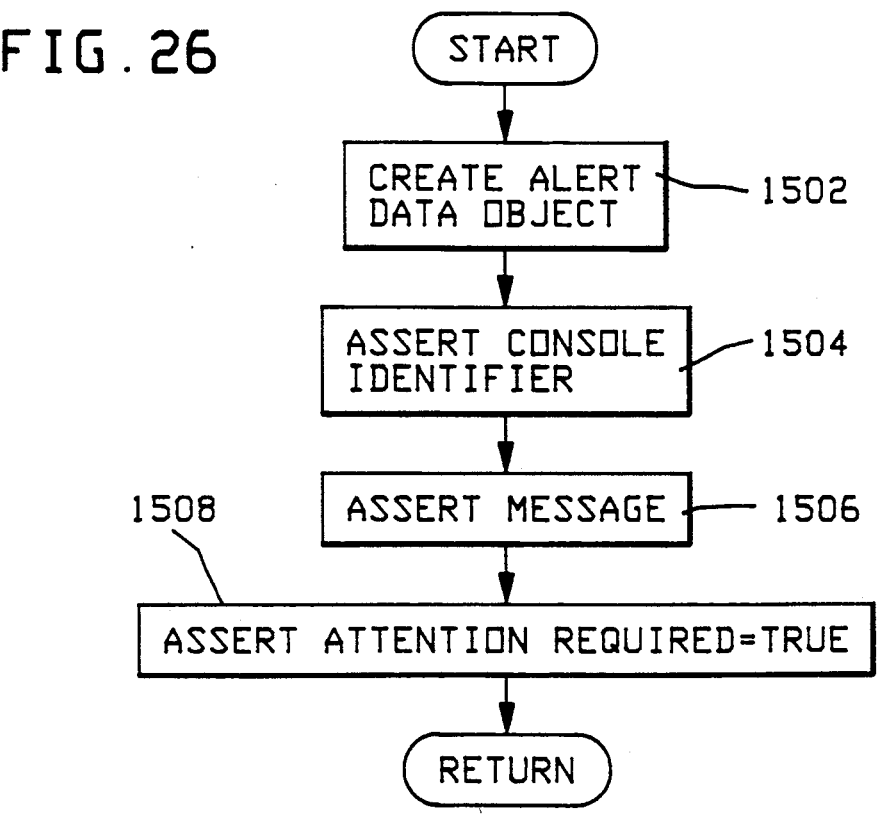
FIG. 26 is the flow chart for Alarm On Processing that is activated when a Console sends an Alarm On message to the Workstation.

FIG. 26 is the flow chart for Alarm On Processing that is activated when a Console 12 sends an Alarm On message to the Workstation 70. Operation 1502 creates an ALERT 1352 data object for the alarm received. After the ALERT data object is created, operation 1504 asserts the CONSOLE IDENTIFIER 1362 attribute with the name of the Console from which the alarm on message originated. Operation 1506 asserts the MESSAGE attribute 1364 with the message received from the Console. Lastly, operation 1508 asserts the ATTENTION REQUIRED attribute 1356 for the CONSOLE data object 1350 to true. Processing then returns to Console Event Processing (See FIG. 25).

Figure 27:
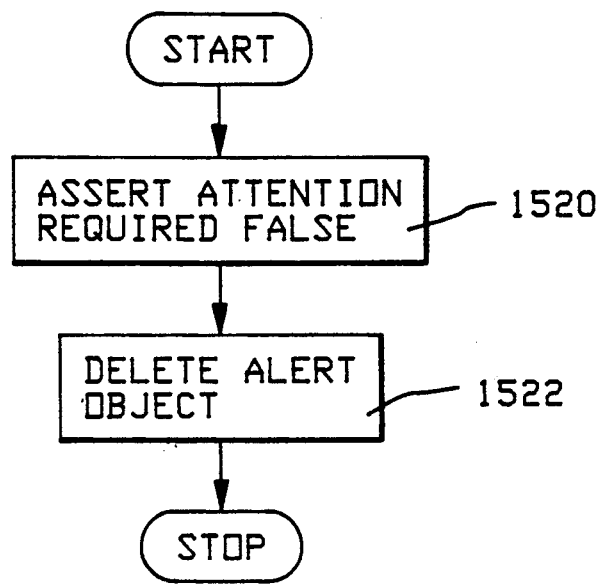
FIG. 27 is the flow chart for Alarm Off Processing that is activated when a Console sends an Alarm Off message to the Workstation.

FIG. 27 is the flow chart for Alarm Off Processing that is activated when a Console 12 sends an Alarm Off message to the Workstation 70. Operation 1520 asserts the ATTENTION REQUIRED attribute 1356 to false for the CONSOLE data object 1350. Following operation 1520, operation 1522 deletes the ALERT data object 1352 whose CONSOLE IDENTIFIER attribute 1362 matches the Console from which the Alarm Off message was received.

Figure 28:
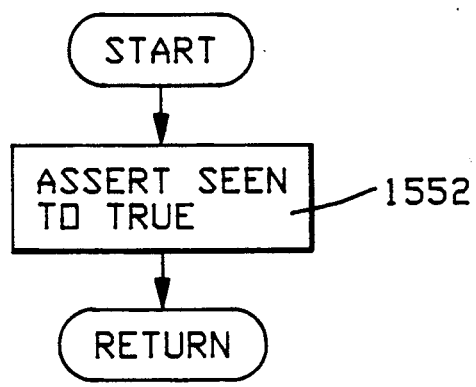
FIG. 28 is the flow chart for Mark Alert Seen Processing.

FIG. 28 is the flow chart for Mark Alert Seen Processing. The Mark Alert Seen Processing is invoked by the Graphical Tool-kit 196 when a user has manipulated the Alert Table entry corresponding to the SEEN attribute 1366 for a Console alarm message. When the Graphical Tool-kit detects an mark-alert-seen action upon the Alert Table Entry for the SEEN attribute, it invokes Mark Alert Seen Processing. Operation 1552 asserts the SEEN attribute 1366 for the ALERT data object 1352 to true and processing returns to the Graphical Tool-kit.

Figure 29:
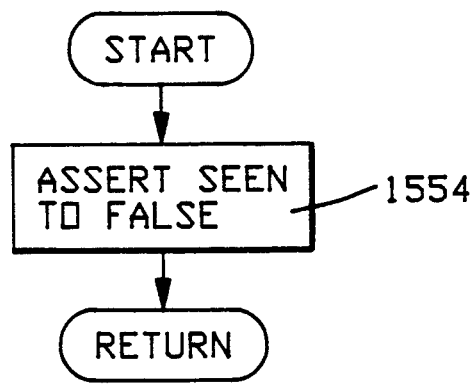
FIG. 29 is the flow chart for Mark Alert Unseen Processing.

FIG. 29 is the flow chart for Mark Alert Unseen Processing. Similar to the Mark Alert Seen Processing, the Mark Alert Unseen Processing is invoked by the Graphical Tool-kit 196 when a user has manipulated the Alert Table entry corresponding to the SEEN attribute 1366 for a Console alarm message. When the Graphical Tool-kit detects an mark-alert-unseen action upon the Alert Table Entry for the SEEN attribute, it invokes Mark Alert Unseen Processing. Operation 1552 asserts the SEEN attribute 1366 for the ALERT data object 1352 to false and processing returns to the Graphical Tool-kit.

Figure 30:
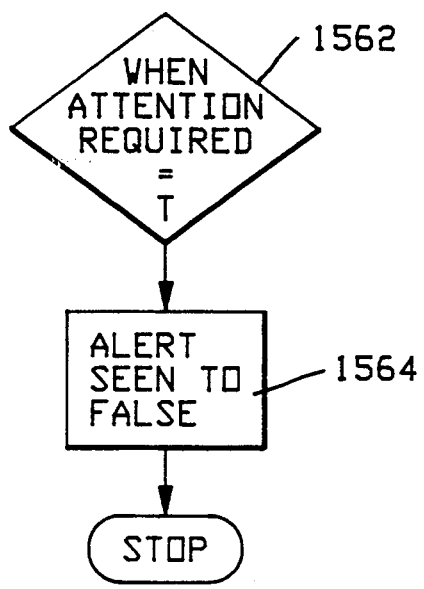
FIG. 30 is the flow chart for the Attention On Demon processing.

FIG. 30 is the flow chart for the Attention On Demon processing. Guard 1562 monitors the ATTENTION REQUIRED attribute 1356 for the CONSOLE data objects 1350. When the ATTENTION REQUIRED attribute for a CONSOLE data object is asserted true, control passes to operation 1564 where the SEEN attribute 1366 in the ALERT data object 1352 whose CONSOLE IDENTIFIER attribute 1362 corresponds to the CONSOLE data object 1350 which triggered the demon is asserted false. After asserting the value the Attention On Demon stops processing.

Figure 31:
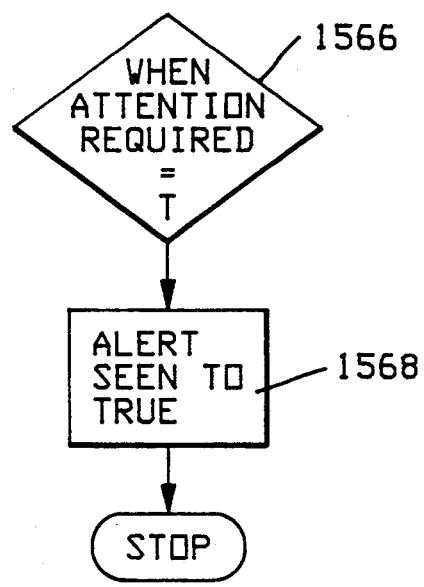
FIG. 31 is the flow chart for the Attention Off Demon processing.

FIG. 31 is the flow chart for the Attention Off Demon processing. Guard 1566 monitors the ATTENTION REQUIRED attribute 1356 for the CONSOLE data objects 1350. When the ATTENTION REQUIRED attribute for a CONSOLE data object is asserted false, control passes to operation 1568 where the SEEN attribute 1366 in the ALERT data object 1352 whose CONSOLE IDENTIFIER attribute 1362 corresponds to the CONSOLE data object 1350 which triggered the demon is asserted true. After asserting the value the Attention Off Demon stops processing.

Figure 32:
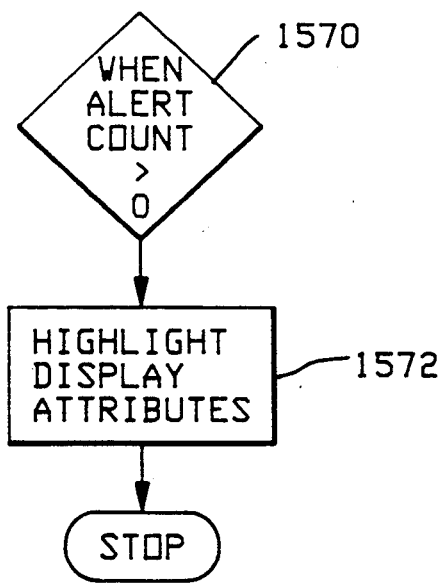
FIG. 32 is the flow chart for the Alert On Demon processing which is fired when an alarm condition exists on a particular Console and the user is not yet aware of the alarm.

FIG. 32 is the flow chart for the Alert On Demon processing which is fired when an alarm condition exists on a particular Console and the user is not yet aware of the alarm. Guard 1570 monitors the ALERT COUNT attribute 1358 for CONSOLE data objects 1350. When the guard detects that the ALERT COUNT for a particular CONSOLE data object is greater than 0, the demon is fired. Operation 1572 asserts various values for the DISPLAY ATTRIBUTES 1360 for the CONSOLE data object to indicate that there is an unnoticed alarm condition. After asserting the DISPLAY ATTRIBUTES, the demon processing stops.

Figure 33:
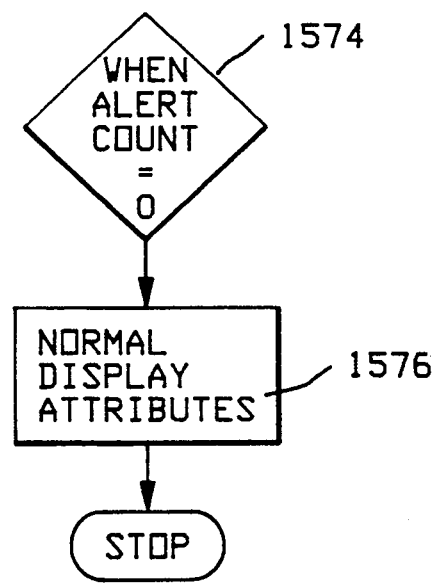
FIG. 33 is the flow chart for the Alert Off Demon processing which is fired when all alarm conditions for a particular Console have been noticed by the user.

FIG. 33 is the flow chart for the Alert Off Demon processing which is fired when all alarm conditions for a particular Console have been noticed by the user. Guard 1574 monitors the ALERT COUNT attribute 1358 for CONSOLE data objects 1350. When the guard detects that the ALERT COUNT for a particular CONSOLE data object is equal to 0, the demon is fired. Operation 1576 asserts various values for the DISPLAY ATTRIBUTES 1360 for the CONSOLE data object to indicate that there is all alarm conditions for the Console have been noticed. After asserting the DISPLAY ATTRIBUTES, demon processing stops.

Figure 34:
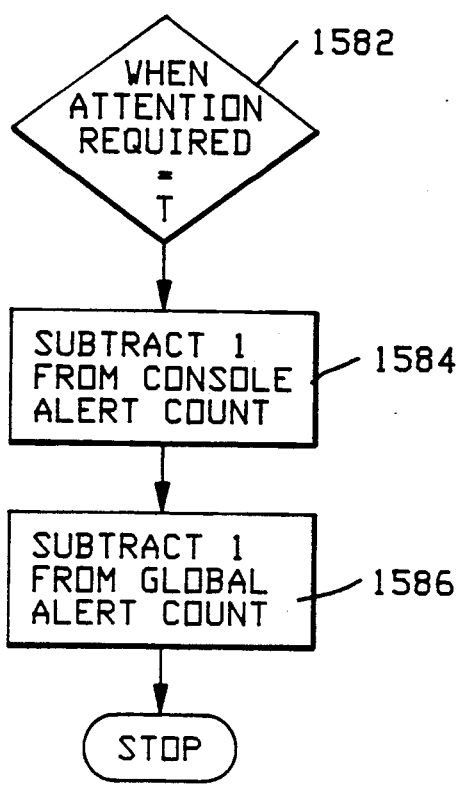
FIG. 34 is the flow chart for the Alert Seen Demon processing.

FIG. 34 is the flow chart for the Alert Seen Demon processing. Guard 1582 monitors the SEEN attribute 1366 for the ALERT data objects 1352. When the SEEN attribute is asserted true, the demon is fired and operation 1584 subtracts 1 from the ALERT COUNT attribute 1358 of the CONSOLE data object 1350 which matches the CONSOLE IDENTIFIER attribute 1362 of the ALERT data object. Operation 1586 subtracts 1 from the ALERT COUNT 1368 for the GLOBAL MESSAGE ICON 1354. After completing operation 1586 the demon processing stops.

Figure 35:
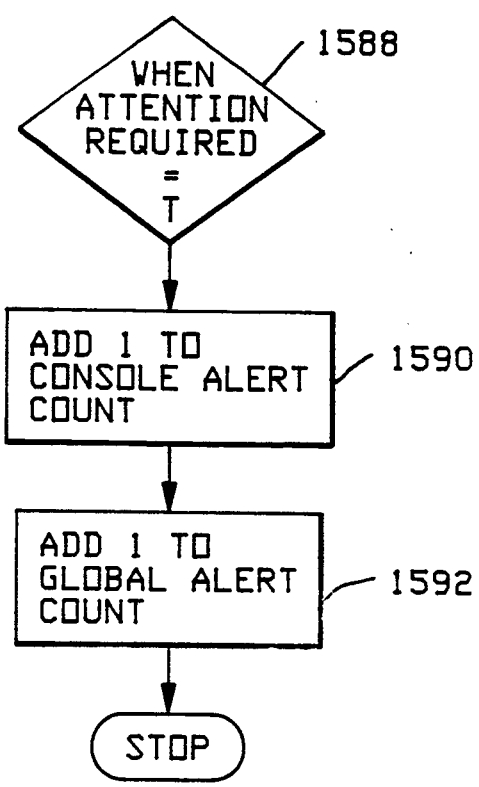
FIG. 35 is the flow chart for the Alert Unseen Demon processing.

FIG. 35 is the flow chart for the Alert Unseen Demon processing. Guard 1588 monitors the SEEN attribute 1366 for the ALERT data objects 1352. When the SEEN attribute is asserted false, the demon is fired and operation 1590 adds 1 to the ALERT COUNT attribute 1358 of the CONSOLE data object 1350 which matches the CONSOLE IDENTIFIER attribute 1362 of the ALERT data object. Operation 1592 adds 1 to the ALERT COUNT 1368 for the GLOBAL MESSAGE ICON 1354. After completing operation 1592 the demon processing stops.

Figure 36:
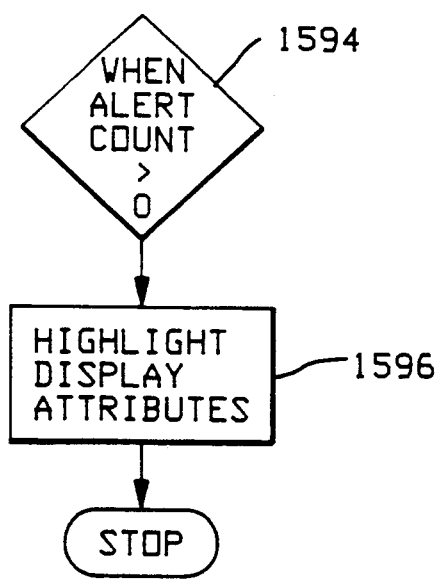
FIG. 36 is the flow chart for the Global Alert On Demon processing.

FIG. 36 is the flow chart for the Global Alert On Demon processing. Guard 1594 monitors the ALERT COUNT attribute 1368 for the GLOBAL MESSAGE ICON 1354. When the ALERT COUNT attribute is greater than 0, the demon is fired and operation 1596 highlights the DISPLAY ATTRIBUTES 1370 to indicate that there is an ALERT data object 1352 whose SEEN attribute 1366 is set to false. After highlighting the DISPLAY ATTRIBUTES demon processing stops.

Figure 37:
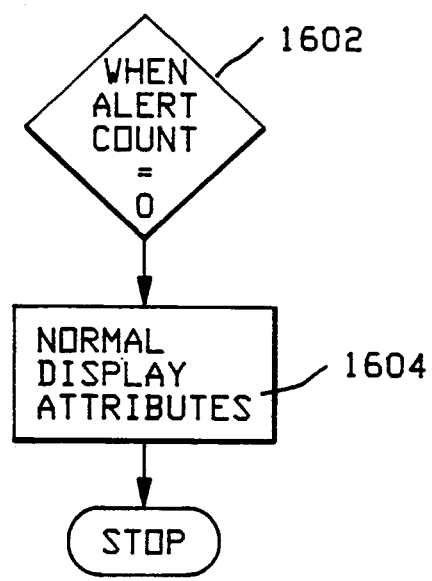
FIG. 37 is the flow chart for the Global Alert Off Demon processing.

FIG. 37 is the flow chart for the Global Alert Off Demon processing. Guard 1602 monitors the ALERT COUNT attribute 1368 for the GLOBAL MESSAGE ICON 1354. When 20 the ALERT COUNT attribute is equal to 0, the demon is fired and operation 1604 asserts normal DISPLAY ATTRIBUTES 1370 to indicate that there are no ALERT data objects 1352 whose SEEN attribute 1366 is set to false. After asserting the DISPLAY ATTRIBUTES demon processing stops.

A system and method have been described for providing console level control of a host processor at a remote location. The present invention can be applied to provide console control of a plurality of host processors at a single remote location thereby reducing operational costs, and console control of a single host processor from a plurality of remote locations, thereby eliminating a single point of failure from a remote operations standpoint.

While only one embodiment of the present invention has been described, it should be understood that those skilled in the art will recognize that alternate embodiments exists which fall within the scope and spirit of the claims set forth below.

What is claimed is:

1. In a data processing system including a first host processor, a second host processor, a first control console coupled to the first hose processor, a second control console coupled to the second host processor, and a communications network to which each of the control consoles is coupled, wherein each of the host processors includes an operator system for controlling allocation of available data processing resources, and each of the control consoles provides an operational control user interface for the associated host processor, wherein each of the control consoles can execute one or more console application programs for interfacing with the host processor operating system, the data processing system further including a remotely located workstation coupled to the communications network, a method for providing alterative operational control of the host processors from the workstation, comprising the steps of:

selecting the first control console from the remotely located workstation for exercising alternative operational control at the remotely located workstation of the first host processor;

replicating the first control console user interface at the remotely located workstation in a first console window, whereby operational control provided by the first control console is alternatively provided at the workstation in said first console window; and selectively inputting a first operational control command in said first console window, whereby operational control is exercised over the first host processor from the remotely located workstation.

2. The method of claim 1, further including the steps of:
    selecting either the first control console or said first console window as a primary console window, whereby input of said operational control command is only allowed at said primary console window; and
    discarding any operation control commands not input at said primary console window.

3. The method of claim 1, further comprising the steps of:
    selecting the second control console from the remotely located workstation for exercising alternative operational control at the remotely located workstation of the second host processor;
    replicating the second control console user interface at the remotely located workstation in a second console window, whereby operational control provided by the second control console is alternatively provided at the remotely located workstation in said second console window; and
    selectively inputting a second operation control command in said second console window, whereby operational control is exercised over the second host processor from the remotely located workstation.

4. The method of claim 1, further comprising the steps of:
    transmitting said first operational control command from the remotely located workstation to the operating system of the first host processor; and
    performing the operation indicated by said first operational control command on the first host processor.

5. The method of claim 4, wherein said transmitting step includes the steps of:
    sending said first operational control command over the communication network from the remotely located workstation to the first control console;
    providing said first operational control command to a console application program, wherein the console application program provides an operational interface to the operating system of the first hose processor; and
    sending said first operational control command from the console application program to the operating system of the first host processor.

6. The method of claim 5, further comprising the step of
    providing output from the console application program at the first control console.

7. The method of claim 6, further comprising the step of
    providing output from the console application program at said first console window on the remotely located workstation.

8. The method of claim 1, further including the steps of:
    detecting an alarm condition at the first control console, wherein said alarm condition is associated with the status of the first host processor and is for notifying an operator that attention is required at the first host processor;
    sending an alarm code from the first control console to the remotely located workstation after said alarm condition is detected; and
    providing an alarm indicator at the remotely located workstation, whereby notification of said alarm condition is made available at the remotely located workstation.

9. The method of claim 8, further including the steps of:
    detecting a deactivate alarm condition at the first control console, wherein said deactivate alarm condition signals that said alarm condition has been removed and operator attention is no longer required at
    sending a deactivate alarm code from the first control console to the remotely located workstation after detecting said deactivate alarm condition; and
    removing said alarm indicator from the remotely located workstation.

10. The method of claim 9 wherein said providing an alarm indicator step comprises the steps of:
    providing an alarm window on the remotely located workstation, wherein said alarm window is available for notifying an operator when an alarm code is received at the remotely located workstation; and
    changing display characteristics of said alarm window when an alarm code is received at the remotely located workstation.

11. The method of claim 3, further including the step of changing the display characteristics of said alarm window when a deactivate alarm code is received by the workstation.

12. In a data processing system including a first host processor, a second host processor, a first control console coupled to the first host processor, a second control console coupled to the second host processor, and a communications network to which each of the control consoles is coupled, wherein each of the host processors includes an operating system for controlling allocation of available data processing resources, and each of the control consoles provides an operational control user interface for the associated host processor, wherein each of the control consoles can execute one or more console application programs for interfacing with the host processor operating system, the data processing system further including a first remotely located workstation and a second remotely located workstation, wherein each of the remotely located workstations is coupled to the communications network, a method for providing alternative operational control of the host processors from the remotely located workstations, comprising the steps of:
    selecting the first control console from the first remotely located workstation for exercising alternative operational control at the first remotely located workstation of the first host processor;
    replicating the first control console user interface at the first remotely located workstation in a first console window, whereby operational control provided by the first control console is alternatively provided at the first remotely located workstation in said first console window;
    selecting the first control console from the second remotely located workstation for exercising alternative operational control at the second remotely located workstation of the first host processor;

replicating the first control console user interface at the second remotely located workstation in a second console window, whereby operational control provided by the first control console is alternatively provided at the second remotely located workstation in said second console window; and selectively inputting an operational control command in said first console window, or said second console window, whereby operational control is exercised over the first host processor.

13. The method of claim 12, further comprising the steps of:

selecting the second control console from the first remotely located workstation for exercising alternative operational control at the first remotely located workstation of the second host processor;

replicating the second control console user interface at the first remotely located workstation in a third console window, whereby operational control provided by the second control console is alternatively provided at the first remotely located workstation in said third console window;

selecting the second control console from the second remotely located workstation for exercising alternative operational control at the second remotely located workstation of the second host processor;

replicating the second control console user interface at the second remotely located workstation in a fourth console window, whereby operational control provided by the second control console is alternatively provided at the second remotely located workstation in said fourth console window; and selectively inputting an operational control command in either said third console window, or said fourth console window, whereby operational control is exercised over the second host processor.

14. The method of claim 12, further comprising the steps of:

transmitting said operation control command from the first remotely located workstation to the operating system of the first hose processor; nd performing the operation indicated by said operational control command on the first host processor.

15. The method of claim 14 wherein said transmitting step includes the steps of:

sending said operational control command over the communication network from the first remotely located workstation to the first control console;

providing said operational control command to a console application program, wherein the console application program provides an operational interface to the operating system of the first host processor; and sending said operational control command from the console application program to the operating system of the first host processor.

16. The method of claim 15, further comprising the step of providing user interface output from the console application program at the first control console.

17. The method of claim 16, further comprising the step of providing user interface output from the console application program at said first console window and said second console window.

18. The method of claim 17, further including the steps of:

detecting an alarm condition at the first control console, wherein said alarm condition is associated with the status of the first host processor and is for notifying an operator that attention is required at the first host processor;

sending a first alarm code from the first control console to the first remotely located workstation when said alarm condition is detected;

providing an alarm indicator at the first remotely located workstation, whereby notification of said alarm condition is made available at the first remotely located workstation;

sending a second alarm code from the first control console to the second remotely located workstation when said alarm condition is detected; and providing a second alarm indicator at the second remotely located workstation, whereby notification of said alarm condition is made available at the second remotely located workstation.

19. The method of claim 18, further including the steps of:

detecting a deactivate alarm condition at the first control console, wherein said deactivate alarm condition signals that said alarm condition has been removed and operator attention is no longer required at the first host processor;

sending a first deactivate alarm code from the first control console to the first remotely located workstation when said deactivate alarm condition is detected;

sending a second deactivate alarm code from the first control console to the second remotely located workstation when said deactivate alarm condition is detected;

removing said first alarm indicator from the first remotely located workstation upon receiving said first deactivate alarm code; and removing said second alarm indicator from the second remotely located workstation upon receiving said second deactivate alarm code.

20. The method of claim 18, wherein said providing a first alarm indicator step comprises the steps of:

providing a first alarm window on the first remotely located workstation, wherein said first alarm window is available for notification when an alarm code is received at the first remotely located workstation;

providing a second alarm window on the second remotely located workstation, wherein said second alarm window is available for notification when an alarm code is received at the second remotely located workstation;

changing display characteristics of said first alarm window when an alarm code is received at the first remotely located workstation; and changing display characteristics of said second alarm window when an alarm code is received at the second remotely located workstation.

21. The method of claim 20 further including the steps of changing said display characteristics of said first alarm window when said first deactivate alarm code is received by the first remotely located workstation; and changing said display characteristics of said second alarm window when said second deactivate alarm code is received by the second remotely located workstation.

22. A data processing system comprising:
a first host processor and a second host processor, wherein each of said first and second host processors includes an operating system for allocating host processor resources;
a first control console coupled to said first hose processor, wherein said first control console provides an operational user interface for control of said first host processor;
a second control console coupled to said second host processor, wherein said second control console provides an operational user interface for control of said second host processor;
a communications network to which each of said first and said second control consoles is communicatively coupled;
a workstation coupled to said communications network, whereby data is transferable between said workstation and said first control console and between said workstation and said second control console;
wherein said workstation includes:
  workstation input means for providing entry of input data to said workstation; and
  workstation display means for displaying output data from said workstation;
wherein said first control console includes:
  first console application means interfaced with said first host processor for providing input commands to said first host processor and receiving status information from said first host processor;
  first display manager means interfaced with said first console application means and interfaced with said communications network for displaying output from said first console application means, providing said output to a first console window at said workstation, and providing input from said first console window to said first console application means;
wherein said second control console includes:
  second console application means interfaced with said second host processor for providing input commands to said second host processor and receiving status information from said second host processor; and
  second display manager means interfaced with said second console application means and interfaced with said communication network for displaying output from said second console application means, providing said output to a second console window at said workstation, and providing input from said second console window to said second console application means; and
wherein said workstation further includes
  window server means interfaced with said communications network, interfaced with said workstation input means, and interfaced with said workstation display means for displaying said output from said first display manager means in said first console window, providing input from said first console window to said first display manager means, displaying said output from said second display manager means in said second console window, and providing input from said second console window to said second display manager means.

23. The data processing system of claim 22, wherein said first display manager means includes lock means for marking a either said first control console or said first console window as a primary console window, whereby said first display manager accepts input from only said primary console window.

24. The data processing system of claim 22,
wherein said first control console further includes:
first alarm detection means interfaced with said first console application means for detecting alarm-on and alarm-off conditions indicative of the status of said first host processor;
first alarm activation means interfaced with said first alarm detection means for sending a first activate alarm code to said workstation when an alarm-on condition is detected, whereby said workstation is notified that said alarm-on condition has occurred;
first alarm deactivation means interfaced with said first alarm detection means for sending a deactivate alarm code to said workstation when an alarm-off condition is detected, whereby said workstation is notified that an alarm-off condition has occurred; and
alarm indicator means interfaced with said window server means for notifying an operator when said activate alarm code is received at said workstation.

25. The data processing system of claim 24, wherein said alarm indicator means further includes:
alarm window means for providing a visual cue when an activate alarm code is received at said workstation; and
means for changing display characteristics of said visual cue upon receipt of said activate alarm code, whereby attention is called to said alarm-on condition.

26. A data processing system comprising:
a host processor, wherein said host processor includes an operating system for allocating host processor resources;
a control console coupled to said host processor, wherein said control console provides an operational user interface for control of said host processor;
a communications network to which each of said control console is communicatively coupled;
a first workstation coupled to said communications network, whereby data is transferable between said first workstation and said control console;
a second workstation coupled to said communications network, whereby data is transferable between said second workstation and said first control console;
wherein said first workstation includes:
  first workstation input means for providing entry of input data to said first workstation; and
  first workstation display means for displaying output data from said first workstation;
wherein said second workstation includes:
  second workstation input means for providing entry of input data to said second workstation; and
  second workstation display means for displaying output data from said second workstation;
wherein said control console includes:
  console application means interfaced with said host processor for providing input commands to said host processor and receiving status information from said host processor; and display manager means interfaced with said console application means and interfaced with said communication network for displaying output from said console application means, providing said output to a first console window at said first workstation, providing said output to a second console window at said second workstation, providing input from said first console window to said console application means, and providing input from said second console window to said console application means;

wherein said first workstation further includes
first window server means interfaced with said communications network, interfaced with said first workstation input means, and interfaced with said first workstation display means for displaying said output from said display manager means in said first console window, and providing input from said first console window to said display manager means; and wherein said second workstation further includes
second window server means interfaced with said communications network, interfaced with said second workstation input means, and interfaced with said second workstation display means for displaying said output from said display manager means in said second console window, and providing input from said second console window to said display manager means.

27. The data processing system of claim 26, wherein said display manager means includes
lock means for marking a either said control console, said first console window or said second console window as a primary console window, whereby said display manager accepts input from only said primary console window.

28. The data processing system of claim 26,
wherein said control console further includes:
alarm detection means interfaced with said console application means for detecting alarm-on and alarm-off conditions indicative of the status of said host processor;
alarm activation means interfaced with said alarm detection means for sending a first activate alarm code to said first workstation and a second activate alarm code to said second workstation when an alarm-on condition is detected, whereby said first workstation and said second workstation are notified that said alarm-on condition has occurred; and
alarm deactivation means interfaced with said alarm detection means for sending a first deactivate alarm code to said first workstation and a second deactivate alarm code to said second workstation when an alarm-off condition is detected, whereby said first workstation and said second workstation are notified that an alarm-off condition has occurred;

wherein said first workstation further includes
first alarm indicator means interfaced with said first window server means for notifying an operator when said first activate alarm code is received at said first workstation; and wherein said second workstation further includes
second alarm indicator means interfaced with said second window server means for notifying an operator when said second activate alarm code is received at said second workstation.

29. The data processing system of claim 28,
wherein said first alarm indicator means includes:
first alarm window means for providing a visual cue at said first workstation when an activate alarm code is received at said first workstation; and
first means for changing display characteristics of said visual cue upon receipt of said first activate alarm code, whereby attention is called to said alarm-on condition;

wherein said second alarm indicator means include:
second alarm window means for providing a visual cue at said second workstation when an activate alarm code is received at said second workstation; and
second means for changing display characteristics of said visual cue upon receipt of said second activate alarm code, whereby attention is called to said alarm-on condition.

* * * * *

UNITED STATES PATENT AND TRADEMARK OFFICE
CERTIFICATE OF CORRECTION

PATENT NO. : 5,315,711
DATED : May 24, 1994
INVENTOR(S) : Stan T. Barone, Ian R. Hepburn, Gary E. Fladmoe, and Robert D. Vavra It is certified that error appears in the above-identified patent and that said Letters Patent is hereby corrected as shown below:

Column 32, line 44, "hose" should be --host--.

Column 34, line 14, "quired at" should be --quired at the first host processor;--.

Column 35, line 40, "operation" should be --operational--.

Signed and Sealed this

Thirteenth Day of December, 1994

Attest:

BRUCE LEHMAN

*Attesting Officer*    *Commissioner of Patents and Trademarks*